United States Patent
Han et al.

(10) Patent No.: US 11,557,966 B1
(45) Date of Patent: Jan. 17, 2023

(54) STEP-DOWN RECTIFIER CIRCUIT, WIRELESS CHARGING RECEIVER CHIP, AND WIRELESS CHARGING RECEIVER

(71) Applicant: Halo Microelectronics Co., Ltd., Foshan (CN)

(72) Inventors: Shuang Han, Foshan (CN); Songnan Yang, Frisco, TX (US); Rui Liu, Fremont, CA (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/518,906

(22) Filed: Nov. 4, 2021

(30) Foreign Application Priority Data

Nov. 5, 2020 (CN) .......................... 202011225743.0

(51) Int. Cl.
 *H02M 3/07* (2006.01)
 *H02J 50/12* (2016.01)
 *H02M 7/5395* (2006.01)
 *H02M 3/158* (2006.01)

(52) U.S. Cl.
 CPC ............... *H02M 3/07* (2013.01); *H02J 50/12* (2016.02); *H02M 3/1588* (2013.01); *H02M 7/5395* (2013.01)

(58) Field of Classification Search
 CPC .... H02M 3/07; H02M 3/1588; H02M 7/5395; H02J 50/12
 See application file for complete search history.

(56) References Cited

U.S. PATENT DOCUMENTS

| | | | |
|---|---|---|---|
| 2011/0248776 A1* | 10/2011 | Petridis | H02M 3/07 327/536 |
| 2017/0054363 A1 | 2/2017 | Mangtani et al. | |
| 2020/0144911 A1* | 5/2020 | Hwang | H02J 50/10 |
| 2022/0166246 A1* | 5/2022 | Han | H02J 50/10 |

FOREIGN PATENT DOCUMENTS

| | | |
|---|---|---|
| CN | 107947305 A | 4/2013 |
| CN | 108233455 A | 6/2018 |
| CN | 110622390 A | 12/2019 |
| CN | 210129739 U | 3/2020 |
| CN | 110970951 A | 4/2020 |

\* cited by examiner

*Primary Examiner* — Kyle J Moody
(74) *Attorney, Agent, or Firm* — Slater Matsil, LLP

(57) ABSTRACT

The present disclosure provides step-down rectifier circuit includes a rectifier module, a charge pump module, a filter unit, and a control unit. The rectifier module includes a first bridge arm unit connected to in-phase output terminal of an alternating current signal and a second bridge arm unit connected to out-of-phase output terminal of the alternating current signal. The charge pump module includes a first voltage converter unit and a second voltage converter unit in parallel. The control unit is configured to output a first pulse width modulation signal to control the on and off of the switch transistors in the rectifier module, and output a second pulse width modulation signal to control the on and off of the switch transistors in the charge pump module, such that an operating frequency of the charge pump module is a positive integer multiple of the frequency of the alternating current signal.

20 Claims, 12 Drawing Sheets

US 11,557,966 B1

STEP-DOWN RECTIFIER CIRCUIT, WIRELESS CHARGING RECEIVER CHIP, AND WIRELESS CHARGING RECEIVER

PRIORITY CLAIM

This application claims the benefit of and priority to Chinese Patent Application No. 202011225743.0, filed on Nov. 5, 2020, which is hereby incorporated by reference in its entirety.

TECHNICAL FIELD

Embodiments of the present disclosure relate to the technical field of wireless charging, and in particular, relates to a step-down rectifier circuit, a wireless charging receiver chip, and a wireless charging receiver.

BACKGROUND

At present, it is common to wirelessly charge batteries in smart phones. Since a wireless charging transmitter transmits energy in the form of a magnetic field, the energy of the magnetic field needs to be converted to electric energy using a wireless charging receiver. For high efficiency, coils of the wireless charging receiver are capable of operating at an operating voltage reaching 20 V to reduce power consumption of resistance in the coils. However, a maximum operating voltage of a single battery is less than 5 V. For a minimum power loss during charging of the battery, a high-efficient DC/DC conversion is needed to lower the output voltage of the wireless charging receiver to 5 V or even lower. A charge pump-based DC/DC converter is a main topological structure for achieving such voltage conversion. Under a 2:1 voltage down conversion ratio, the efficiency may reach 98%.

For a single-battery power supply system, two charge pump-based DC/DC converters need to be cascaded (first 4:2 and then 2:1), to lower the output voltage (up to 20 V) of the wireless charging receiver to the voltage (up to 5 V) of the single battery. Therefore, three integrated circuit chips are used in front of the battery.

In practice, the wireless charging receiver and the high-voltage 4:2 charge pump are generally placed together to be proximal to the coils of the wireless charging receiver, and the low-voltage 2:1 charge pump is placed to be proximal to a battery connector. This is because an output current of the 2:1 charge pump is four times an output current of the wireless charging receiver. A device with such high output current needs to be placed close to the load thereof, to reduce power consumption of the resistors in a PCB as much as possible. In a smart phone system, configuration of such components allows the wireless charging receiver and the high-voltage charge pump to be integrated in a single device.

A conventional down converting and rectification scheme in a wireless charging receiver is generally as illustrated in FIG. 1. In FIG. 1, although the wireless charging receiver and the charge pump are integrated, the two parts of circuitry operate independently. The characteristic lies in that output of the wireless charging receiver circuit $V_{rect}$ and input of the charge pump down converting circuit $V_{PMID}$ are filtered by $C_{RECT}$ and $C_{PMID}$ respectively to achieve the behavior of a voltage source, such that the two parts of circuitry are cascaded but capable of operating relatively independently.

However, in some applications that impose a stricter requirement on output ripples, capacitances of filter capacitors $C_{RECT}$, $C_{PMID}$ and $C_{OUT}$ (including the input capacitance of a latter-stage circuit) in the circuit of FIG. 1 are often far greater than those of $C_{FLY1}$ or $C_{FLY2}$. In this case, during the process of charging the capacitor $C_{FLY1}$ or $C_{FLY2}$, due to the very uneven current distribution, a lot of additional charge transfer loss may be caused, thereby resulting in that power conversion efficiency is not optimal. In some applications which are sensitive to the number of peripheral devices and an occupied board area, the output filter capacitor $C_{OUT}$, capacitances of the input filter capacitors $C_{RECT}$ and $C_{PMID}$ tend to be close to that of $C_{FLY1}$ or $C_{FLY2}$ even less than that of $C_{FLY1}$ or $C_{FLY2}$. In this case, the output ripples of the rectifier may be passed on to the charge pump circuit, such that the two parts cannot operate fully decoupled, resulting in a reduction in power conversion efficiency. In addition, since the traditional system control scheme adopts a charge pump operating frequency that is not related to a coil current frequency, the operations of the rectifier and the charge pump fail to be coordinated to optimize the power conversion efficiency.

SUMMARY

In a first aspect, the embodiments of the present disclosure provide a step-down rectifier circuit. The step-down rectifier circuit includes: a rectifier module including a first bridge arm unit and a second bridge arm unit, wherein the first bridge arm unit is connected in parallel with the second bridge arm unit, the first bridge arm unit is connected to an in-phase output terminal of an external alternating current signal, and the second bridge arm unit is connected to an out-of-phase output terminal of the alternating current signal; a charge pump module connected to the rectifier module, wherein the charge pump module includes a first voltage converter unit and a second voltage converter unit, the first voltage converter unit being connected in parallel with the second voltage converter unit and the second bridge arm unit; a filter unit connected to a voltage output terminal of the first voltage converter unit and a voltage output terminal of the second voltage converter unit; and a control unit connected to the rectifier module and the charge pump module, wherein the control unit is configured to output, based on the alternating current signal, a first pulse width modulation signal to control the on and off of switch transistors in the rectifier module, and output a second pulse width modulation signal to control the on and off of switch transistors in the charge pump module, such that an operating frequency of the charge pump module is N times a frequency of the alternating current signal, wherein N is a positive integer.

In some embodiments, when the alternating current signal is in a positive half cycle, the $n^{th}$ voltage level transition of the second pulse width modulation signal occurs when the phase angle of the alternating current signal is:

$$\theta 1_n = \frac{n\pi}{N}$$

wherein n=0, 1, 2, . . . , N; when the alternating current signal is in a negative half cycle, the phase angle of the alternating current signal during each voltage level transition of the second pulse width modulation signal is symmetrical to the phase angle of the alternating current signal in the positive half cycle.

In some embodiments, the first voltage converter unit includes a first capacitor and a first switch assembly, wherein the first capacitor is connected to the first switch assembly, and the first capacitor is configured to be charged or discharged based on the on or off state of the first switch assembly; the second voltage converter unit includes a second capacitor and a second switch assembly, wherein the second capacitor is connected to the second switch assembly, and the second capacitor is configured to be charged or discharged based on the on or off state of the second switch assembly; and the filter unit includes a filter capacitor, wherein one terminal of the filter capacitor is connected to the voltage output terminal of the first voltage converter unit and the voltage output terminal of the second voltage converter unit, and the other terminal of the filter capacitor is connected to ground.

In some embodiments, the capacitance of the first capacitor or the second capacitor is less than the capacitance of the filter capacitor; and when the alternating current signal is in the positive half cycle, the $k^{th}$ voltage level transition of the second pulse width modulation occurs when the phase angle of the alternating current signal is:

$$\theta 2_k = \arccos\left(1 - \frac{2k}{N}\right)$$

wherein k=0, 1, 2, ..., N; or when the alternating current signal is in a negative half cycle, the phase angles of the alternating current signal during each voltage level transition of the second pulse width modulation signal is symmetrical to the phase angle of the alternating current signal in the positive half cycle.

In some embodiments, the capacitance of the first capacitor or the second capacitor is greater than or equal to the capacitance of the filter capacitor; and when the alternating current signal is in the positive half cycle, and when N is an even number, the $m^{th}$ voltage level transition of the second pulse width modulation signal occurs when the phase angle of the alternating current signal satisfies:

$$\frac{m\pi}{N} \leq \theta 3_m \leq \arccos\left(1 - \frac{2m}{N}\right)$$

wherein m=0, 1, 2, ..., N/2; wherein the phase angle further satisfies:

$$\frac{m\pi}{N} \geq \theta 3_m \geq \arccos\left(1 - \frac{2m}{N}\right)$$

wherein m=N, N−1, ..., N/2; when N is an odd number, the $m^{th}$ voltage level transition of the second pulse width modulation signal occurs when phase angle of the alternating current signal satisfies:

$$\frac{m\pi}{N} \leq \theta 3_m \leq \arccos\left(1 - \frac{2m}{N}\right)$$

wherein m=0, 1, 2, ..., (N−1)/2; and the phase angle further satisfies:

$$\frac{m\pi}{N} \geq \theta 3_m \geq \arccos\left(1 - \frac{2m}{N}\right)$$

wherein m=N, N−1, ..., (N+1)/2; or when the alternating current signal is in a negative half cycle, the phase angles of the alternating current signal during each voltage level transition of the second pulse width modulation signal is symmetrical to the phase angle of the alternating current signal in the positive half cycle.

In some embodiments, the first bridge arm unit includes a first switch transistor and a second switch transistor, wherein the first switch transistor and the second switch transistor are connected in series in the same direction, and the connection node between source of the first switch transistor and drain of the second switch transistor is a first connection node, and the in-phase output terminal of the alternating current signal is connected to the first connection node. The second bridge arm unit includes a third switch transistor and a fourth switch transistor, wherein the third switch transistor and the fourth switch transistor are connected in series in the same direction, and the connection node between source of the third switch transistor and drain of the fourth switch transistor is a second connection node, the out-of-phase output terminal of the alternating current signal is connected to the second connection node; the first switch assembly includes a fifth switch transistor, a sixth switch transistor, a seventh switch transistor, and an eighth switch transistor that are successively connected in series in the same direction, wherein one terminal of the first capacitor is connected to source of the fifth switch transistor, and the other terminal of the first capacitor is connected to source of the seventh switch transistor; the second switch assembly includes a ninth switch transistor, a tenth switch transistor, an eleventh switch transistor, and a twelfth switch transistor that are successively connected in series in the same direction, wherein one terminal of the second capacitor is connected to source of the ninth switch transistor, and the other terminal of the second capacitor is connected to source of the eleventh switch transistor; wherein drain of the first switch transistor is connected to drain of the third switch transistor, drain of the fifth switch transistor and drain of the ninth switch transistor; source of the second switch transistor, source of the fourth switch transistor, source of the eighth switch transistor and source of the twelfth switch transistor are all connected to ground; and wherein the connection node between the sixth switch transistor and the seventh switch transistor and the connection node between the tenth switch transistor and the eleventh switch transistor are both connected to one terminal of the filter capacitor at a third connection node.

In some embodiments, in response to the first pulse width modulation signal being at a high voltage level, the control unit controls the first switch transistor and the fourth switch transistor to be turned on, and controls the second switch transistor and the third switch transistor to be turned off; or in response to the first pulse width modulation signal being at a low voltage level, the control unit controls the second switch transistor and the third switch transistor to be turned on, and controls the first switch transistor and the fourth switch transistor to be turned off; and in response to the second pulse width modulation signal being at a high voltage level, the control unit controls the fifth switch transistor, the seventh switch transistor, the tenth switch transistor, and the twelfth switch transistor to be turned on, and controls the sixth switch transistor, the eighth switch transistor, the ninth switch transistor, and the eleventh switch transistor to be turned off; or in response to the second pulse width modulation signal being at a low voltage level, the control unit controls the sixth switch transistor, the eighth switch transistor, the ninth switch transistor, and the eleventh switch transistor to be turned on, and controls the fifth switch transistor, the seventh switch transistor, the tenth switch transistor, and the twelfth switch transistor to be turned off; wherein at zero-crossings of the alternating current signal, the voltage level transitions of the first pulse width modulation signal and the second pulse width modulation signal occurs simultaneously.

In some embodiments, the step-down rectifier circuit further includes a regulator circuit, wherein the regulator circuit includes a thirteenth switch transistor and a fourth capacitor; wherein a drain of the thirteenth switch transistor is connected to a third connection node, a source of the thirteenth switch transistor is connected to one terminal of the fourth capacitor, and the other terminal of the fourth capacitor is connected to ground.

In some embodiments, the step-down rectifier circuit further includes a bias power supply circuit, wherein the bias power supply circuit includes a first bias switch transistor, a second bias switch transistor, a low-dropout linear regulator, and a second filter capacitor; wherein a voltage input terminal of the low-dropout linear regulator is connected to a drain of the first bias switch transistor, a drain of the second bias switch transistor, and one terminal of the second filter capacitor, a source of the first bias switch transistor is connected to a first connection node, a source of the second bias switch transistor is connected to a second connection node, and the other terminal of the second filter capacitor is connected to ground.

In a second aspect, the embodiments of the present disclosure further provide a wireless charging receiver chip. The wireless charging receiver chip includes the step-down rectifier circuit as described above.

In a third aspect, the embodiments of the present disclosure further provide a wireless charging receiver. The wireless charging receiver includes a wireless charging receiver coil and the wireless charging receiver chip as described above, wherein the wireless charging receiver coil is configured to generate the alternating current signal.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

Figure 2:
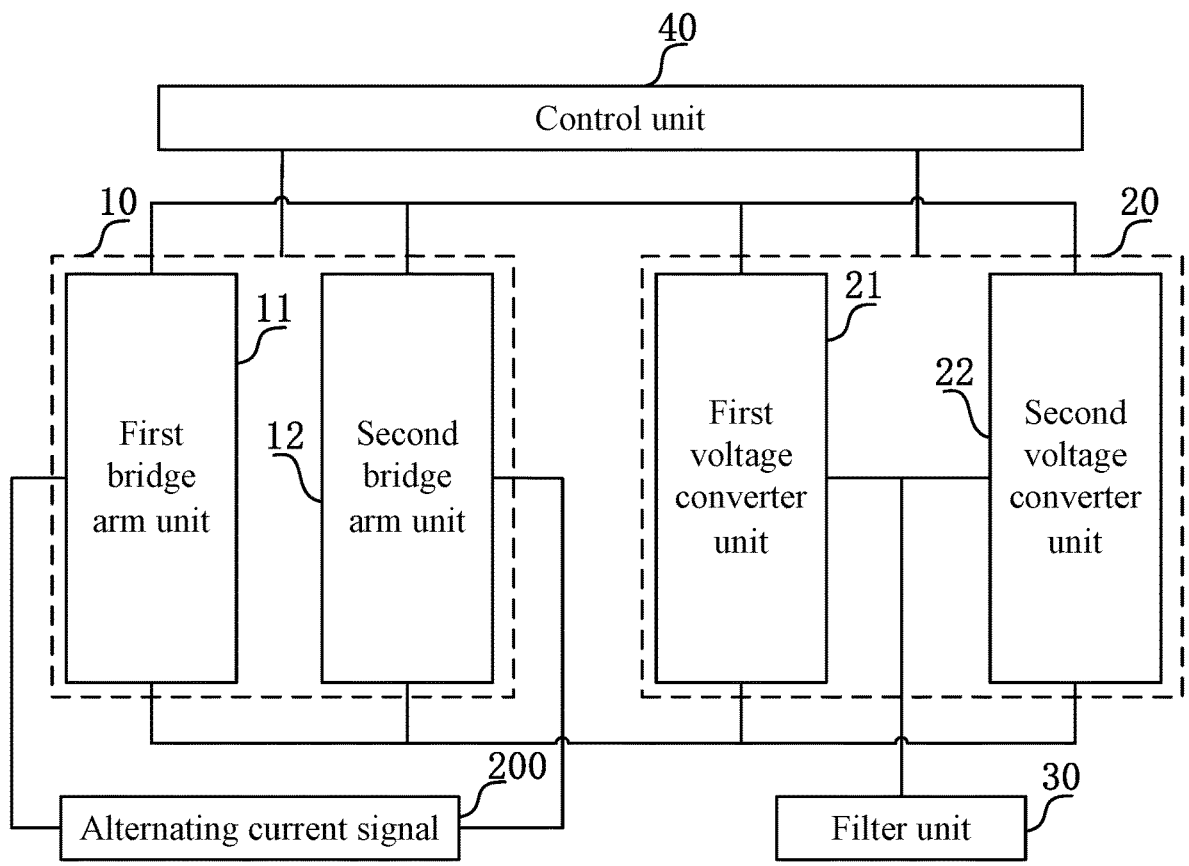
FIG. 2 is a schematic structural diagram of a step-down rectifier circuit according to one embodiment of the present disclosure.

Referring to FIG. 2, FIG. 2 is a schematic structural diagram of a step-down rectifier circuit according to one embodiment of the present disclosure. As illustrated in FIG. 2, the step-down rectifier circuit includes a rectifier module 10, a charge pump module 20, a filter unit 30, and a control unit 40. The rectifier module 10 includes a first bridge arm unit 11 and a second bridge arm unit 12, and the charge pump module 20 includes a first voltage converter unit 21 and a second voltage converter unit 22.

Specifically, the first bridge arm unit 11 is connected in parallel with the second bridge arm unit 12, the first bridge arm unit 11 is connected to an in-phase output terminal of an external alternating current signal 200, and the second bridge arm unit 12 is connected to an out-of-phase output terminal of the alternating current signal 200. The first voltage converter unit 21 is connected in parallel with the second voltage converter unit 22 and the second bridge arm unit 12. The filter unit 30 is connected to a voltage output terminal of the first voltage converter unit 21 and a voltage output terminal of the second voltage converter unit 22. The control unit 40 is connected to the rectifier module 10 and the charge pump module 20.

Furthermore, the control unit 40 is connected to gates of switch transistors in the rectifier module 10, and gates of switch transistors in the charge pump module 20. The control unit 40 is configured to output, based on the alternating current signal 200, a first pulse width modulation signal to control the on and off of switch transistors in the rectifier module 10, and output a second pulse width modulation signal to control the on and off of switch transistors in the charge pump module 20, such that the operating frequency of the charge pump module 20 is a positive integer multiple of the frequency of the alternating current signal 200, and thus the two parts of circuits of the rectifier module and the charge pump module operate together to achieve a higher power conversion efficiency.

Figure 3:
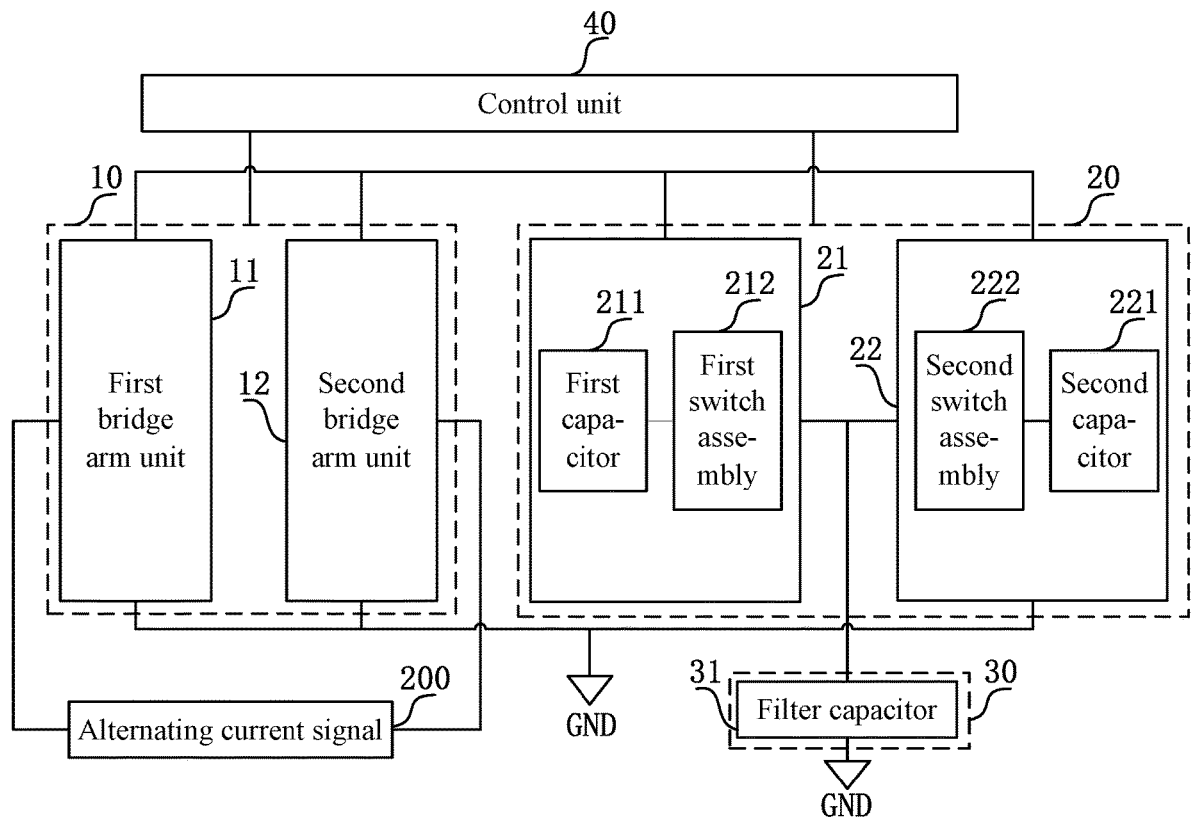
FIG. 3 is a schematic structural diagram of a step-down rectifier circuit according to another embodiment of the present disclosure.

In some embodiments, as illustrated in FIG. 3, the first voltage converter unit 21 includes a first capacitor 211 and a first switch assembly 212, the second voltage converter unit 22 includes a second capacitor 221 and a second switch assembly 222, and the filter unit 30 includes a filter capacitor 31. The first capacitor 211 is connected to the first switch assembly 212, the second capacitor 221 is connected to the second switch assembly 222, and one terminal of the filter capacitor 31 is connected to the voltage output terminal of the first voltage converter unit 21. The voltage output terminal of the second voltage converter unit 22, and the other terminal of the filter capacitor 31 is connected to ground.

Specifically, the first capacitor 211 is configured to be charged or discharged based on the on or off state of the first switch assembly 212, and the second capacitor 221 is configured to be charged or discharged based on the on or off state of the second switch assembly 222. In this embodiment, when the first capacitor 211 is in a charging state, the second capacitor 221 is in a discharging state; on the contrary, when the second capacitor 221 is in a charging state, the first capacitor 211 is in a discharging state.

Figure 4:
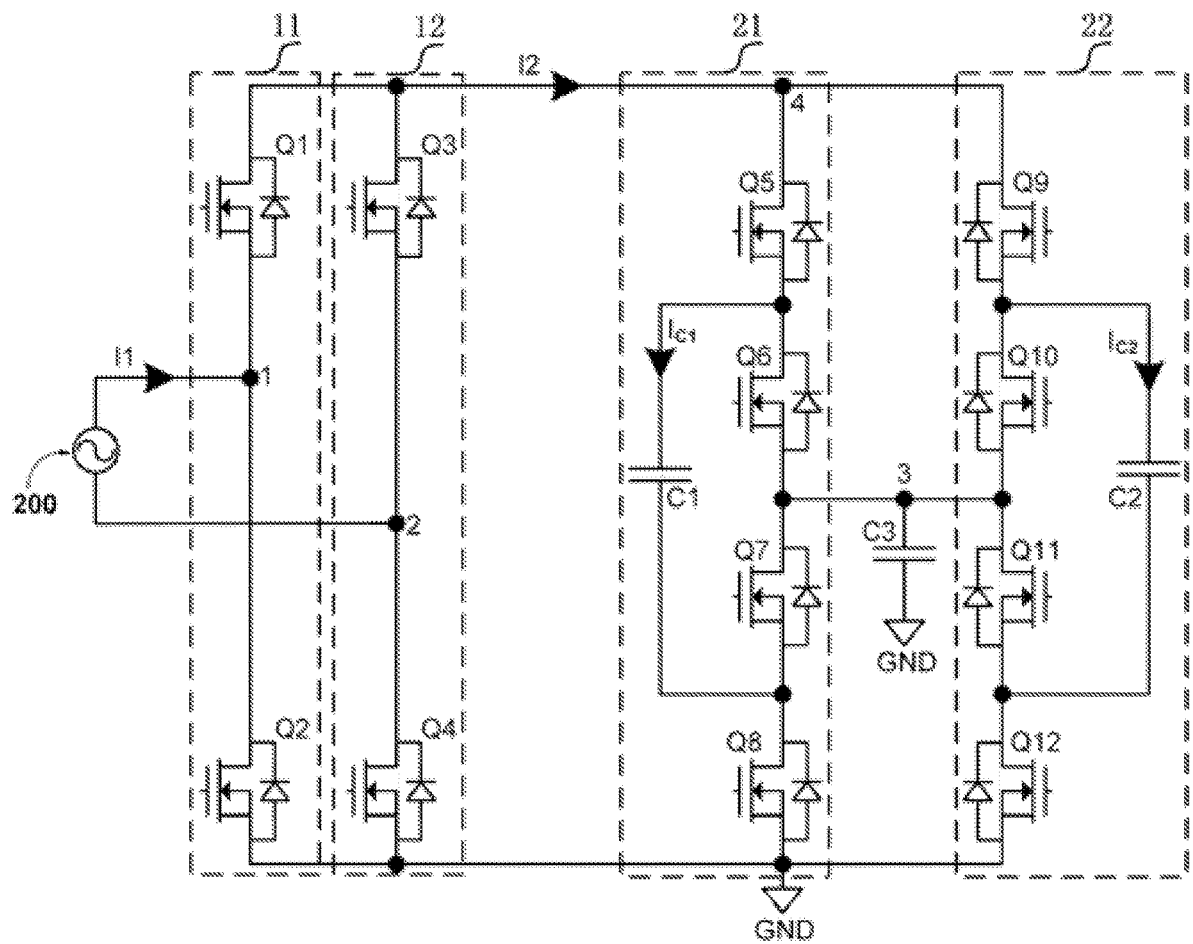
FIG. 4 is a schematic circuit diagram of a step-down rectifier circuit according to one embodiment of the present disclosure.

In another embodiment, referring to FIG. 3 and FIG. 4, the first bridge arm unit 11 includes a first switch transistor Q1 and a second switch transistor Q2; the second bridge arm unit 12 includes a third switch transistor Q3 and a fourth switch transistor Q4; the first switch assembly 212 includes a fifth switch transistor Q5, a sixth switch transistor Q6, a seventh switch transistor Q7, and an eighth switch transistor Q8 that are successively connected in series in the same direction; and the second switch assembly 222 includes a ninth switch transistor Q9, a tenth switch transistor Q10, an eleventh switch transistor Q11, and a twelfth switch transistor Q12 that are successively connected in series in the same direction.

The first switch transistor Q1 and the second switch transistor Q2 are connected in series in the same direction, that is, a source of the first switch transistor Q1 is connected to a drain of the second switch transistor Q2, and a connection node between the source of the first switch transistor Q1 and the drain of the second switch transistor Q2 is a first connection node 1. The in-phase output terminal of the alternating current signal 200 is connected to the first connection node 1. The third switch transistor Q3 and the fourth switch transistor Q4 are connected in series in the same direction, that is, a source of the third switch transistor Q3 is connected to a drain of the fourth switch transistor Q4, and a connection node between the source of the third switch transistor Q3 and the drain of the fourth switch transistor Q4 is a second connection node 2. The out-of-phase output terminal of the alternating current signal 200 is connected to the second connection node 2.

One terminal of the first capacitor C1 is connected to a source of the fifth switch transistor Q5 and a drain of the sixth switch transistor Q6, and the other terminal of the first capacitor C1 is connected to a source of the seventh switch transistor Q7 and a drain of the eighth switch transistor Q8. A source of the sixth switch transistor Q6 is connected to a drain of the seventh switch transistor Q7. One terminal of the second capacitor C2 is connected to a source of the ninth switch transistor Q9 and a drain of the tenth switch transistor Q10. The other terminal of the second capacitor C2 is connected to a source of the eleventh switch transistor Q11 and a drain of the twelfth switch transistor Q12. A source of the tenth switch transistor Q10 is connected to a drain of the eleventh switch transistor Q11.

In addition, a drain of the first switch transistor Q1 is connected to a drain of the third switch transistor Q3, a drain of the fifth switch transistor Q5, and a drain of the ninth switch transistor Q9. A source of the second switch transistor Q2, a source of the fourth switch transistor Q4, a source of the eighth switch transistor Q8, and a source of the twelfth switch transistor Q12 are all connected to ground. A connection node between the sixth switch transistor Q6 and the seventh switch transistor Q7, and a connection node between the tenth switch transistor Q10 and the eleventh switch transistor Q11 are both connected to one terminal of a filter capacitor C3 at a third connection node 3. The other terminal of the filter capacitor C3 is connected to ground.

Figure 1:
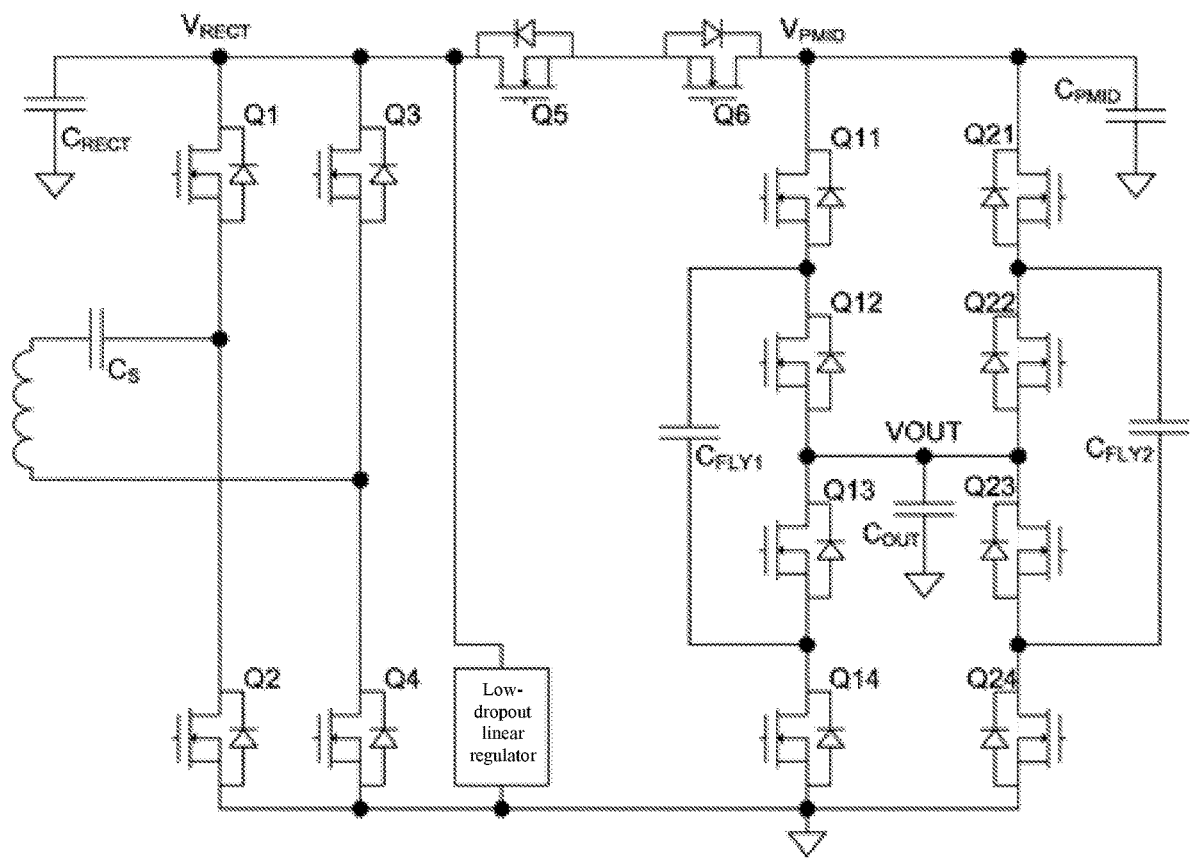
FIG. 1 is a schematic circuit diagram of a wireless charging receiver cascaded with a charge pump down converting circuit according to the related art.

In summary, as compared with the charge pump down converting circuit cascaded with the wireless charging receiver circuit in the related art, as illustrated in FIG. 1, the step-down rectifier circuit according to present disclosure at least omits the filter capacitors $C_{RECT}$ and filter capacitors $C_{PMID}$. The filter capacitor $C_{RECT}$ and filter capacitor $C_{PMID}$ usually have a larger capacitance. A plurality of capacitors need to be connected in parallel in the circuit, which causes an increase of occupied area on the board in the overall solution and an increase of cost. Therefore, compared with the related art, the present disclosure reduces the occupied area of the down converting rectifier in the board and saves the cost.

Figure 5:
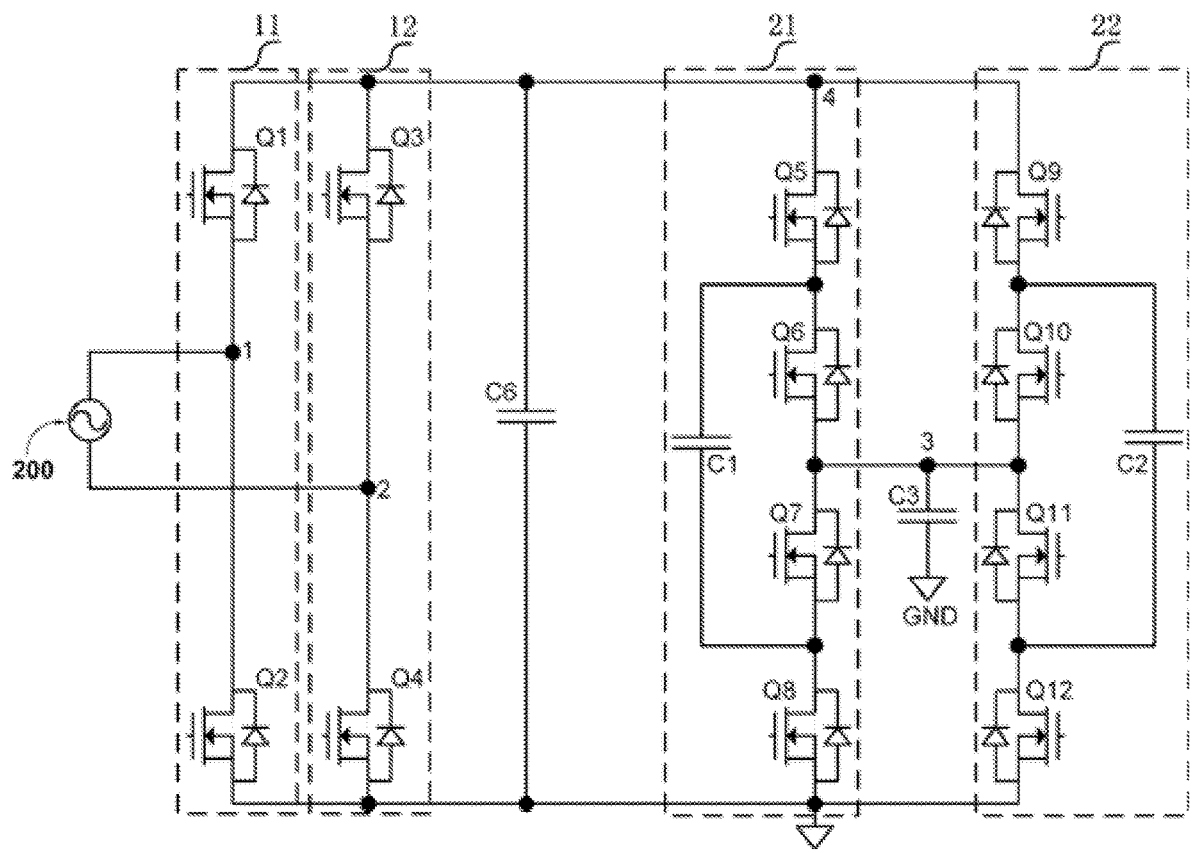
FIG. 5 is a schematic circuit diagram of a step-down rectifier circuit according to another embodiment of the present disclosure.

Optionally, as illustrated in FIG. 5, the step-down rectifier circuit further includes an isolation capacitor C6, wherein the isolation capacitor C6 configures to isolate the rectifier module 10 from the charge pump module, such that the voltage at the connection node 4 between the drain of the fifth switch transistor Q5 and the drain of the ninth switch transistor Q9 is stable.

Figure 6:
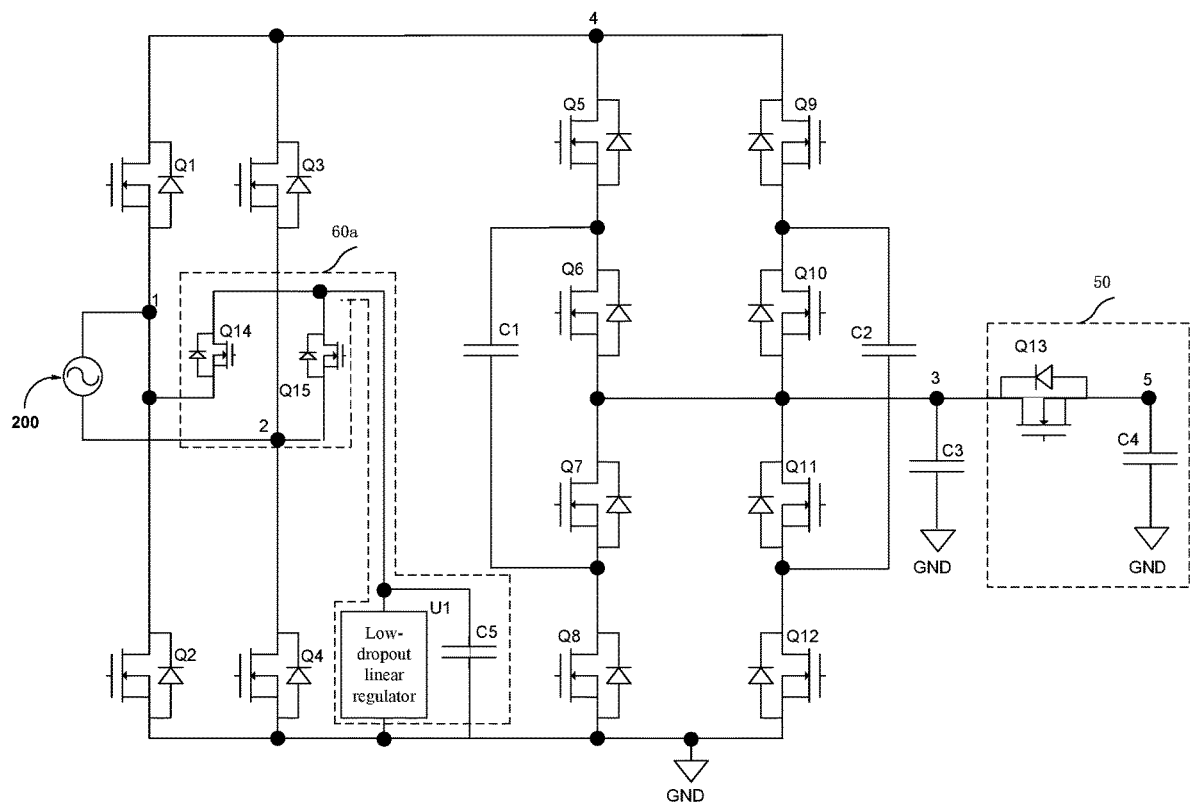
FIG. 6 is a schematic circuit diagram of a step-down rectifier circuit according to still another embodiment of the present disclosure.

Optionally, as illustrated in FIG. 6, the step-down rectifier circuit further includes a regulator circuit 50, wherein the regulator circuit 50 includes a thirteenth switch transistor Q13 and a fourth capacitor C4. A drain of the thirteenth switch transistor Q13 is connected to a third connection node 3, a source of the thirteenth switch transistor Q13 is connected to one terminal of the fourth capacitor C4, and the other terminal of the fourth capacitor C4 is connected to ground.

The regulator circuit 50 is configured to further stabilize the voltage for circuits connected to it and realizes functions including current and voltage measurement, and the like.

Optionally, the step-down rectifier circuit further includes a bias power supply circuit 60a, wherein the bias power supply circuit 60a includes a first bias switch transistor Q14, a second bias switch transistor Q15, a low-dropout linear regulator U1, and a second filter capacitor C5. A voltage input terminal of the low-dropout linear regulator U1 is connected to a drain of the first bias switch transistor Q14, a drain of the second bias switch transistor Q15, and one terminal of the second filter capacitor C5. A source of the first bias switch transistor Q14 is connected to a first connection node 1, a source of the second bias switch transistor Q15 is connected to a second connection node 2, and the other terminal of the second filter capacitor C5 is connected to ground.

The bias power supply circuit 60a is initially intended to act as a startup bias power supply. In the case that the alternating current signal 200 is just applied to the step-down rectifier circuit, the low-dropout linear regulator U1 acquires a bias power supply by the first bias switch transistor Q14, the second bias switch transistor Q15, the second switch transistor Q2, and the fourth switch transistor Q4, and by filtering with the second filter capacitor C5. The bias power supply acts as a startup power supply of the control unit 40. In this way, the wireless charging receiver circuit according to the present disclosure can be automatically started up without an external bias power supply when the wireless charging receiver circuit is placed on a wireless charging transmitter. In another aspect, the bias power supply circuit 60a is further intended to apply a voltage from the bias power supply to monitoring a voltage of a receiver coil, and in turn to regulate the output power of the wireless charging transmitter such that a desired output voltage is acquired at a wireless receiver end.

Figure 7:
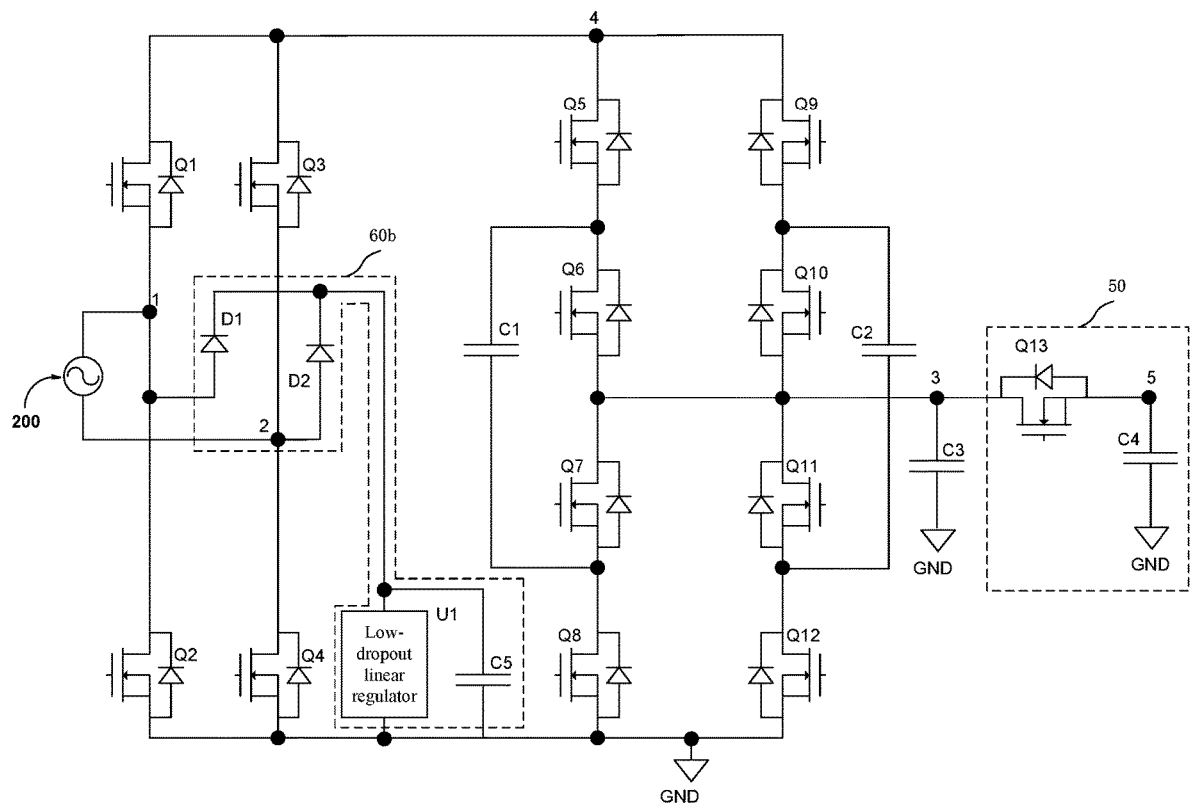
FIG. 7 is a schematic circuit diagram of a step-down rectifier circuit according to yet still another embodiment of the present disclosure.

In another embodiment, as illustrated in FIG. 7, FIG. 7 illustrates a specific embodiment of another bias power supply circuit 60b. Specifically, the bias power supply circuit 60b includes a first diode D1, a second diode D2, a low-dropout linear regulator U1, and a second filter capacitor C5. A voltage input terminal of the low-dropout linear regulator U1 is connected to a cathode of the first diode D1, a cathode of the second diode D2, and one terminal of the second filter capacitor C5. An anode of the first diode D2 is connected to the first connection node 1, an anode of the second diode D2 is connected to the second connection node 2, and the other terminal of the second filter capacitor C5 is connected to ground. The function of the bias power supply circuit 60b is similar to that of the bias power supply circuit 60a, which is within the scope that is easily understood by those skilled in the art and is not detailed herein any further.

Furthermore, in order to improve the power conversion efficiency, the embodiment of the present disclosure also provides two types of control schemes. The first control scheme is that the control signal output by the control unit 40 for controlling the switch transistors in the charge pump module 20 uses 50% duty cycle, that is, the second pulse width modulation signal uses 50% duty cycle. The second control scheme is that the control signal output by the control unit 40 for controlling the switch transistors in the charge pump module 20 uses non-50% duty cycle, that is, the second pulse width modulation signal uses non-50% duty cycle. It may be understood that in the above two control schemes, the operating frequency of the charge pump module 20 is a positive integer multiple of the frequency of the alternating current signal 200.

It should be noted that no matter whether the first control scheme or the second control scheme is adopted, the control mode of the rectifier module 10 is the same. This is because the frequency of the rectifier module 10 is the same as the frequency of the alternating current signal 200. Therefore, the control scheme of the rectifier module 10 is always as follows: when the alternating current signal 200 is in a positive half cycle, the first pulse width modulation signal is at high voltage level; and when the alternating current signal 200 is in a negative half cycle, the first pulse width modulation signal is at low voltage level the voltage level transition of the first pulse width modulation signal occurs at every zero-crossing point of the alternating current signal 200. In addition, voltage level transition of the first pulse width modulation signal and the second pulse width modulation signal are simultaneously occurs at the zero-crossing timing of the alternating current signal 200.

Both the first control scheme and the second control scheme are applicable to the circuit as illustrated in FIG. 4, FIG. 5, FIG. 6, or FIG. 7.

In the case that the first control scheme is adopted, the second pulse width modulation signal uses 50% duty cycle. Specifically, when the alternating current signal 200 is in a positive half cycle, the $n^{th}$ voltage level transition of the second pulse width modulation signal occurs when phase angle $\theta 1_n$ of the alternating current signal 200 is:

$$\theta 1_n = \frac{n\pi}{N},$$

wherein n=0, 1, 2, . . . , N.

The operating frequency of the charge pump module 20 is N times the frequency of the alternating current signal 200, wherein N is a positive integer. Alternatively, when the alternating current signal 200 is in the negative half cycle, the phase angle of the alternating current signal 200 during each voltage level transition of the second pulse width modulation signal is symmetrical to the phase angle of the alternating current signal 200 in the positive half cycle. That is, during each voltage level transition of the second pulse width modulation signal, a difference between the phase angle of the alternating current signal 200 in a negative half cycle and the phase angle of the alternating current signal 200 in a positive half cycle is 180 degrees. For example, when the alternating current signal 200 is in a positive half cycle, the phase angle of the alternating current signal during each voltage level transition of the second pulse width modulation signal is 60 degrees, and thus when the alternating current signal 200 is in a negative half cycle, the phase angle of the alternating current signal 200 during each voltage level transition of the second pulse width modulation signal is 240 degrees.

For example, in another embodiment, the operating frequency of the charge pump module 20 is equal to the frequency of the alternating current signal 200. That is, N is set to 1, and since n is less than or equal to N, n may only be 1, it may be known that the phase angle of the alternating current signal 200 during each voltage level transition is 180 degrees. Therefore, when the alternating current signal 200 is in a negative half cycle, the phase angle of the alternating current signal 200 during each voltage level transition of the second pulse width modulation signal is 360 degrees.

In practice, the implementation process of adopting the first control scheme is described with reference to the circuit as illustrated in FIG. 4.

Figure 8:
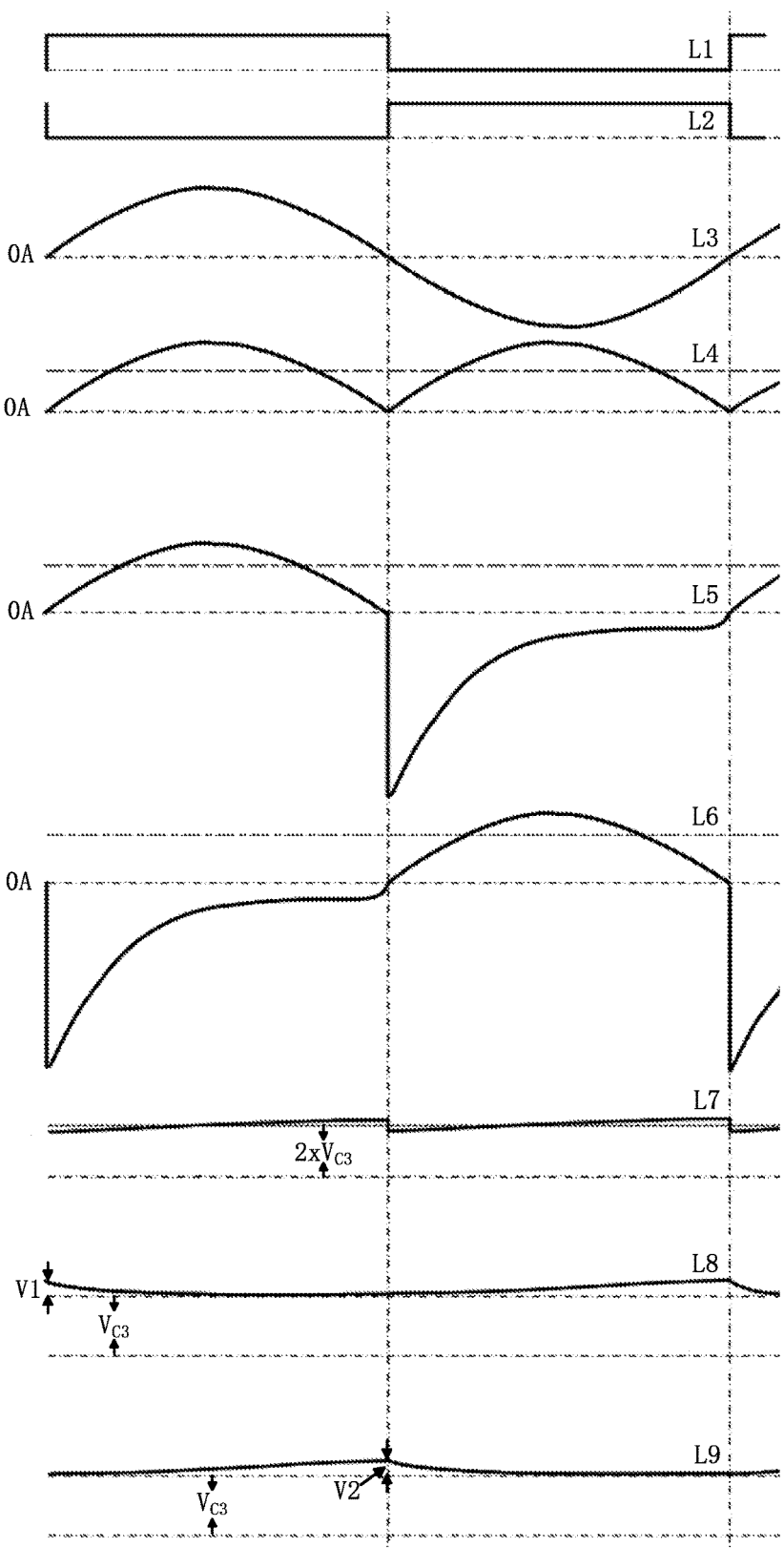
FIG. 8 is a diagram of the voltage and a current waveform of the step-down rectifier circuit according to one embodiment of the present disclosure.

Continue referencing to FIG. 8, FIG. 8 is a diagram of voltage and current waveform of a step-down rectifier circuit. A straight line OA is the straight line when the current is 0; a curve L1 illustrates switch signals of the first switch transistor Q1, the fourth switch transistor Q4, the fifth switch transistor Q5, and the seventh switch transistor Q7, the tenth switch transistor Q10, and the twelfth switch transistor Q12; a curve L2 illustrates switch signals of the second switch transistor Q2, the third switch transistor Q3, the sixth switch transistor Q6, the eighth switch transistor Q8, the ninth switch transistor Q9, and the eleventh switch transistor Q11; a curve L3 illustrates a waveform of a current I1 that is also the waveform of the alternating current signal 200; a curve L4 illustrates a waveform of a current I2; a curve L5 illustrates a waveform of a current $I_{C1}$; a curve L6 illustrates a waveform of a current $I_{C2}$; a curve L7 illustrates a waveform of a voltage at a connection node 4 between a drain of the fifth switch transistor Q5 and a drain of the ninth switch transistor Q9; a curve L8 illustrates a waveform of a voltage across the second capacitor C2; and the curve L9 illustrates a waveform of a voltage across the first capacitor C1.

When the alternating current signal 200 being in a positive half cycle, the first pulse width modulation signal is a high voltage level signal, and the control unit 40 controls the first switch transistor Q1 and the fourth switch transistor Q4 to be turned on and controls the second switch transistor Q2 and the third switch transistor Q3 to be turned off. The second pulse width modulation signal is a high voltage level signal, the corresponding curve L1 illustrates a high voltage level signal, and the curve L2 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off.

The current I2 flowing through the rectifier module 20, charges the first capacitor C1 through the fifth switch transistor Q5 and the seventh switch transistor Q7, and the second capacitor C2 discharges power to the filter capacitor C3 and a load through the tenth switch transistor Q10 and the twelfth switch transistor Q12. The load refers to a load connected to the third connection node 3. That is, the step-down rectifier circuit according to the embodiment of the present disclosure provides an operating voltage to the load through the third connection node 3. Due to the current source characteristics of the current I2, a charging current waveform of the current $I_{C1}$ is a sine wave the same as that of the I2, such that a pulse current does not occur, and charge transfer loss may be significantly reduced. In the process that the second capacitor C2 discharges power to the filter capacitor C3 and the load, it may be seen from the curve L8 that a slight voltage difference V1 is present between the voltage across the second capacitor C2 and the voltage VD across the filter capacitor C3. Therefore, the discharging current $I_{C2}$ may generate a pulse current.

Similarly, when the alternating current signal 200 is in the negative half cycle, the first pulse width modulation signal is a low voltage level signal, and the control unit 40 controls the second switch transistor Q2 and the third switch transistor Q3 to be turned on and controls the first switch transistor Q1 and the fourth switch transistor Q4 to be turned off. The second pulse width modulation signal is a low voltage level signal, the corresponding curve L1 illustrates a low voltage level signal, and the curve L2 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off.

The current I2 flowing through the rectifier module 20 charges the second capacitor C2 through the ninth switch transistor Q9 and the eleventh switch transistor Q11, and the first capacitor C1 discharges power to the filter capacitor C3 and a load through the sixth switch transistor Q6 and the eighth switch transistor Q8. Due to the current source characteristics of the current I2, a charging current waveform of the current $I_{C2}$ is a sine wave, the same as that of the I2, such that a pulse current does not occur, and charge transfer loss may be significantly reduced. In the process that the second capacitor C1 discharges power to the filter capacitor C3 and the load, it may be seen from the curve L9 that a slight voltage difference V2 is present between the voltage across the first capacitor C1 and the voltage $V_{C3}$ across the filter capacitor C3. Therefore, the discharging current $I_{C1}$ may generate a pulse current.

Therefore, the alternating current signal 200 continuously and alternately operates between the positive half cycle and the negative half cycle. It may be seen from the curve L7 that the voltage $V_{C3}$ at the third connection node 3 is converted to half of the voltage at the fourth connection node 4, the voltage at the fourth connection node 4 is a rectified input voltage, and the voltage $V_{C3}$ is an output voltage, that is, the input voltage is twice the output voltage.

Furthermore, in the case that the capacitance of the filter capacitor C3 is far greater than that of the first capacitor C1 or the second capacitor C2, the equivalent impedance Re of the charge pump module in the step-down rectifier circuit as illustrated in FIG. 4 may be expressed as:

$$R_e = R_{ec} + R_{ed}$$
$$= \frac{1}{4} \cdot (R_1 + R_3 + R_{FLY}) + \frac{1}{8} \cdot \frac{1}{2f_1 C_1} \cot\left(\frac{\beta_3}{2}\right)$$
$$\text{wherein } \beta_3 = \frac{1}{2f_1(R_2 + R_4 + R_{FLY})C_1}.$$

R1, R2, R3, and R4 respectively represent on-resistances of the fifth switch transistor Q5, the sixth switch transistor Q6, the seventh switch transistor Q7, and the eighth switch transistor Q8, and the on-resistance of the fifth switch transistor Q5 is equal to that of the ninth switch transistor Q9, the on-resistance of the sixth switch transistor Q6 is equal to that of the tenth switch transistor Q10, the on-resistance of the seventh switch transistor Q7 is equal to that of the eleventh switch transistor Q11, and the on-resistance of the eight switch transistor Q8 is equal to that of the twelfth switch transistor Q12. $R_{FLY}$ represents an equivalent resistance of the first capacitor C1 or the second capacitor C2 at the switching frequency. It is assumed that the first capacitor C1 and the second capacitor C2 have the same capacitance. The expression of an equivalent resistance Re is constituted by two parts, wherein a first half Rec represents the contribution of an uneven current waveform to system loss during a charging cycle of the first capacitor C1 and the second capacitor C2, and a second half Red represents the contribution of the first capacitor C1 and the second capacitor C2 to the system losses during a discharging cycle. f1 represents is a frequency of an alternating current I1.

In the related art as illustrated in FIG. 1, the charge pump down converting circuit is cascaded with the wireless charging receiver circuit. Due to the presence of capacitors $C_{PMID}$ and $C_{IN}$, the input terminal of the charge pump circuit $V_{PMID}$ exhibits voltage source characteristics. In the charging cycles of $C_{FLY1}$ and $C_{FLY2}$, the equivalent impedances of the $C_{FLY1}$ and $C_{FLY2}$ are similar to the expression of the discharging cycle, and the pulse current may appear in both the charging cycle and the discharging cycle.

In the circuit structure as illustrated in FIG. 4 of the present disclosure, due to the current source characteristics of the current I2, the equivalent impedance Rec of the charge pump circuit during the charging cycle of the first capacitor C1 or the second capacitor C2 may be simply expressed as an equivalent series impedance of a charging link of the first capacitor C1 or the second capacitor C2, and the value of the equivalent series impedance is constantly smaller than the equivalent load caused by the pulse current $I_{C1}$ or the pulse current $I_{C2}$. That is, when the operating frequency of the charge pump module 20 is the same as the frequency of the alternating current signal 200, the efficiency of the step-down rectifier circuit as illustrated in FIG. 4 is constantly higher than that of the wireless charging receiver circuit where the charge pump down converting circuit is cascaded, in the related art as illustrated in FIG. 1, and thus the power conversion efficiency during wireless charging is improved.

Figure 9:
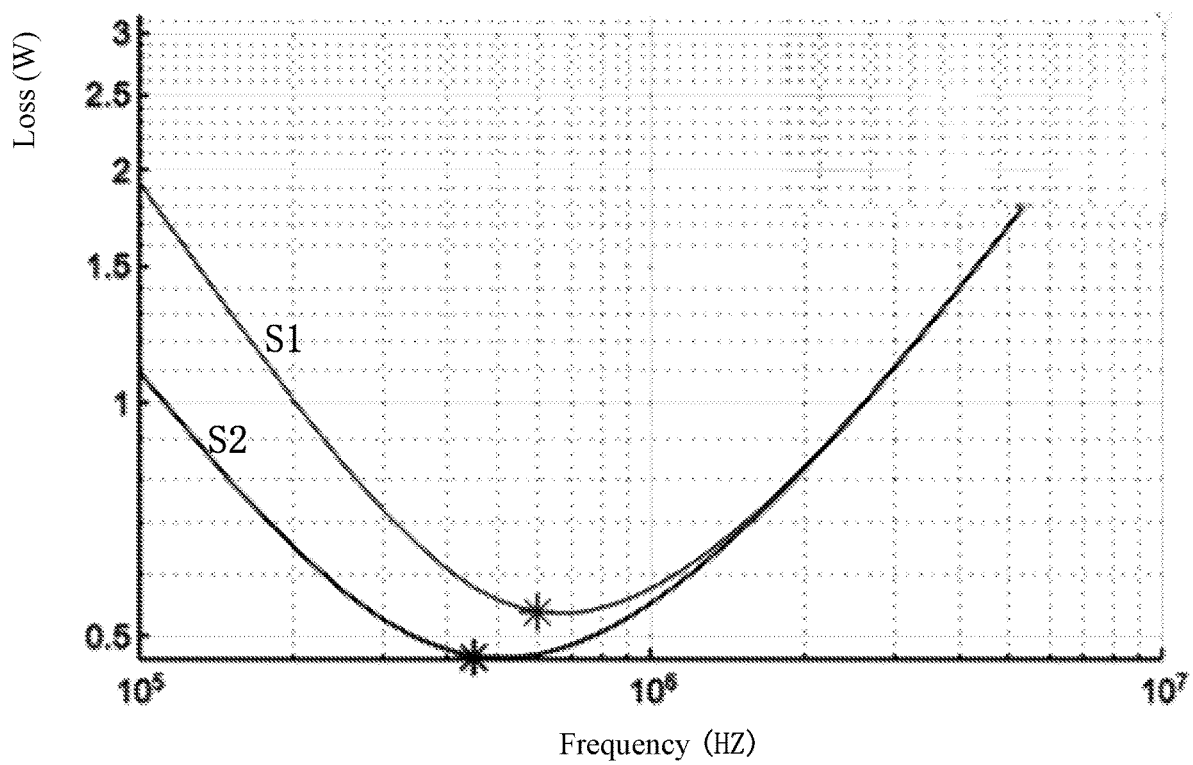
FIG. 9 is a diagram of a comparison of circuit loss between the step-down rectifier circuit according to embodiments of the present disclosure, and the charge pump down converting circuit cascaded in the wireless charging receiver according to the related art.

Using a scenario where the frequency of the alternating current I1 and the operating frequency of the charge pump module 20 are both 150 KHz as an example, as illustrated in FIG. 9, a curve S1 illustrates loss of the wireless charging receiver circuit where the charge pump down converting circuit is cascaded during the operation, and a curve S2 illustrates loss of the step-down rectifier circuit during the operation according to the present disclosure.

It is apparent that, at the operating frequency of the charge pump of 150 KHz, the loss corresponding to the curve S1 is much greater than that of the curve S2, and the loss of the wireless charging receiver circuit where the charge pump down converting circuit is cascaded during the operation in the related art is constantly greater than that of the step-down rectifier circuit according to the present disclosure during the operation. In addition, as the operating frequency of the charge pump module 20 increases, the loss of the two circuit structures decreases until the switching loss in the circuit becomes dominant loss at high frequencies. Therefore, the efficiency of the step-down rectifier circuit according to the present disclosure is constantly higher than the efficiency of the wireless charging receiver circuit where the charge pump down converting circuit is cascaded in the related art. It may also be seen from FIG. 9 that a lowest point of a total loss of the step-down rectifier circuit according to the present disclosure occurs when the operating frequency of the charge pump is several times higher than the frequency (150 KHz) of the alternating current. In order to achieve a possible optimal system efficiency, a system control method capable of enabling the charge pump to operate at a multiple of the frequency of the alternating current is desired.

In another embodiment, the operating frequency of the charge pump module 20 is twice the frequency of the alternating current signal 200. That is, in the case that N is set to 2, n may be 1 or 2, it may be known that the phase angles of the alternating current signal 200 during each voltage level transition are 90 degrees and 180 degrees respectively. Therefore, when the alternating current signal 200 is in a negative half cycle, the phase angles of the alternating current signal 200 during each voltage level transition of the second pulse width modulation signal are 270 degrees and 360 degrees respectively.

Similarly, the implementation process of adopting the first control scheme is described with reference to the circuit as illustrated in FIG. 4.

Figure 10:
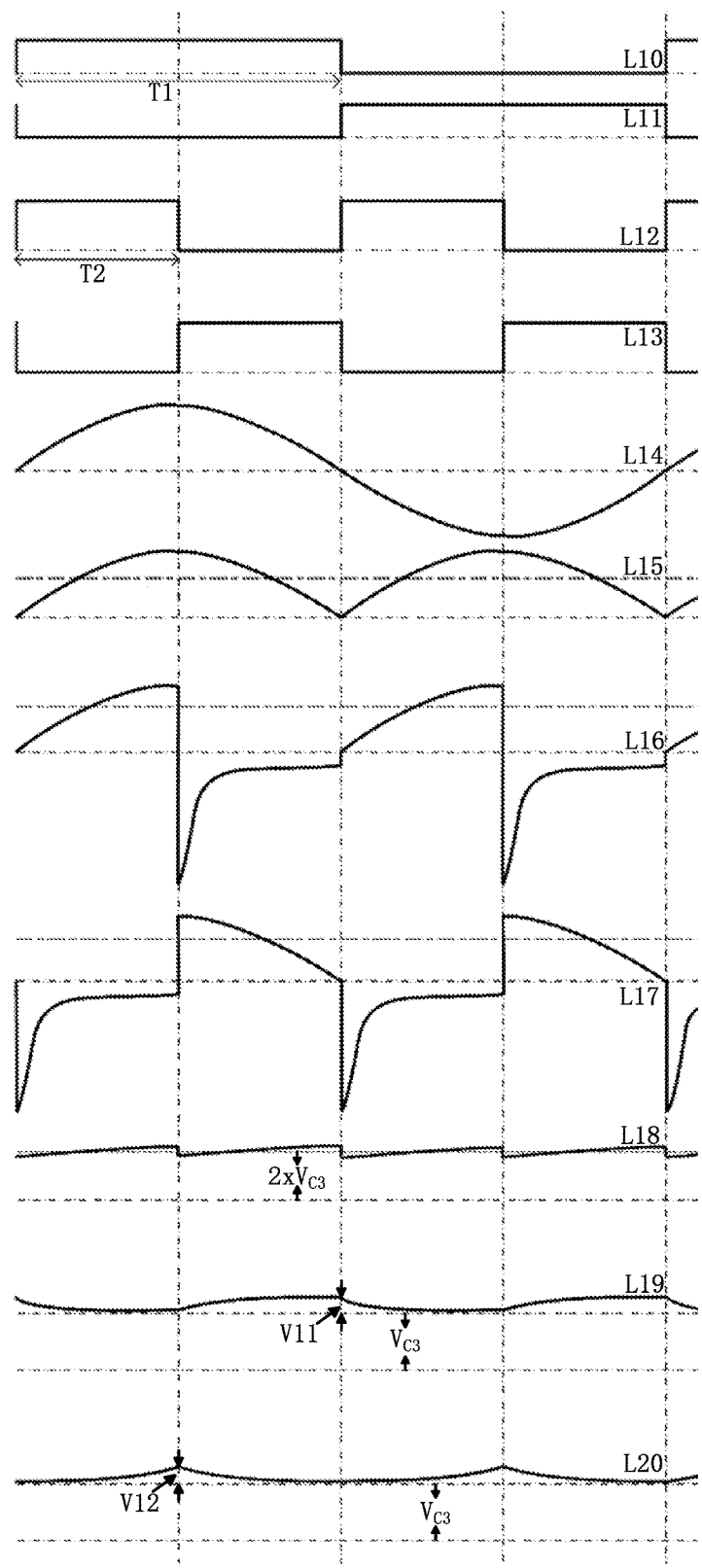
FIG. 10 is a diagram of the voltage and a current waveform of the step-down rectifier circuit according to another embodiment of the present disclosure.

Continue referencing to FIG. 10, a curve L10 illustrates switch signals of the first switch transistor Q1 and the fourth switch transistor Q4; a curve L11 illustrates switch signals of the second switch transistor Q2 and the third switch transistor Q3; a curve L12 illustrates switch signals of the fifth switch transistor Q5, the seventh switch transistor Q7, the tenth switch transistor Q10, and the twelfth switch transistor Q12; a curve L13 illustrates switch signals of the sixth switch transistor Q6, the eighth switch transistor Q8, the ninth switch transistor Q9, and the eleventh switch transistor Q11; a curve L14 illustrates a waveform of the current I1, and also illustrates a waveform of the alternating current signal 200; a curve L15 illustrates a waveform of the current I2; a curve L16 illustrates a waveform of the current $I_{C1}$; a curve L17 illustrates a waveform of the current $I_{C2}$; a curve L18 illustrates a waveform of a voltage at the connection node 4 between a drain of the fifth switch transistor Q5 and a drain of the ninth switch transistor Q9; a curve L19 illustrates a waveform of the voltage across the second capacitor C2, and it may be seen from the curve L19 that a slight voltage difference V11 is present between the voltage across the second capacitor C2 and the voltage $V_{C3}$ across the filter capacitor C3; and a curve L20 illustrates a waveform of a voltage across the first capacitor C1, and it may be seen from the curve L20 that a slight voltage difference V12 is present between the voltage across the first capacitor C1 and the voltage $V_{C3}$ across the filter capacitor C3.

When the alternating current signal 200 is in a positive half cycle, the first pulse width modulation signal is a high voltage level signal, the corresponding curve L10 illustrates a high voltage level signal, and the curve L11 illustrates a low voltage level signal. In this case, the control unit 40 controls the first switch transistor Q1 and the fourth switch transistor Q4 to be turned on and controls the second switch transistor Q2 and the third switch transistor Q3 to be turned off.

When the alternating current signal 200 is in a first half of the positive half cycle, that is, before the alternating current signal 200 reaches its peak value, the second pulse width modulation signal is a high voltage level signal, the corresponding curve L12 illustrates a high voltage level signal, and the curve L13 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 10 charges the first capacitor C1 through the fifth switch transistor Q5 and the seventh switch transistor Q7, and the second capacitor C2 discharges power to the filter capacitor C3 and a load through the tenth switch transistor Q10 and the twelfth switch transistor Q12.

When the alternating current signal 200 is in a second half of the positive half cycle, that is, before the alternating current signal 200 decreases from the peak value to 0, the second pulse width modulation signal is a low voltage level signal, the corresponding curve L12 illustrates a low voltage level signal, and the curve L13 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 10 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

When the alternating current signal 200 is in a negative half cycle, the first pulse width modulation signal is a low voltage level signal, the corresponding curve L10 illustrates a low voltage level signal, and the curve L11 illustrates a high voltage level signal. In this case, the control unit 40 controls the second switch transistor Q2 and the third switch transistor Q3 to be turned on and controls the first switch transistor Q1 and the fourth switch transistor Q4 to be turned off.

When the alternating current signal 200 is in a first half of the negative half cycle, that is, before the alternating current signal 200 reaches its negative peak value from 0, the second pulse width modulation signal is a high voltage level signal, the corresponding curve L12 illustrates a high voltage level signal, and the curve L13 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 10 charges the first capacitor C1 through the fifth switch transistor Q5 and the seventh switch transistor Q7, and the second capacitor C2 discharges power to the filter capacitor C3 and the load through the tenth switch transistor Q10 and the twelfth switch transistor Q12.

When the alternating current signal 200 is in a second half of the negative half cycle, that is, before the alternating current signal 200 decreases from the negative peak value to 0, the second pulse width modulation signal is a low voltage level signal, the corresponding curve L12 illustrates a low voltage level signal, and the curve L13 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 10 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

The alternating current signal 200 continuously and alternately operates between the positive half cycle and the negative half cycle. It may be seen from the curve L18 that the voltage $V_{C3}$ at the third connection node 3 is converted to half of the voltage at the fourth connection node 4, the voltage at the fourth connection node 4 is a rectified input voltage, and the voltage $V_{C3}$ is an output voltage, that is, the input voltage is twice the output voltage.

In summary, conducting periods of the first switch transistor Q1, the second switch transistor Q2, the third switch transistor Q3, and the fourth switch transistor Q4 in the rectifier module 10 are T1, and conducting periods of the fifth switch transistor Q5, the sixth switch transistor Q6, and seventh switch transistor Q7, the eighth switch transistor Q8, the ninth switch transistor Q9, the tenth switch transistor Q10, the eleventh switch transistor Q11, and the twelfth switch transistor Q12 are T2, wherein T2=½T1, that is, the duty cycle of the control signal of the switch transistors in the charge pump module 20 is 50%. Since the current I2 charges the first capacitor C1 and the second capacitor C2 for the same duration T2, an equal total amount of charges are supplemented to the first capacitor C1 and the second capacitor C2 in each cycle. This results in an equal voltage difference between the voltage across the first capacitor C1 and the voltage at the third connection node 3, and the voltage difference between the voltage across the second capacitors C2 and the voltage at the third connection node 3. At the instant when the first capacitor C1 and the second capacitor C2 discharge power to the load and the filter capacitor C3, the generated pulse current also has an equal amplitude, the description of equivalent impedance and loss in the previous formula may still be valid, and the efficiency advantage relative to the rectifier circuit and the charge pump circuit operating at the same operating frequency is preserved.

In another embodiment, the operating frequency of the charge pump module 20 is three times the frequency of the alternating current signal 200. That is, in the case that N is set to 3, n may be 1, 2, or 3, it may be known that the phase angles of the alternating current signal 200 during each voltage level transition are 60 degrees, 120 degrees, and 180 degrees respectively. Therefore, when the alternating current signal 200 is in a negative half cycle, the phase angles of the alternating current signal 200 during each voltage level transition of the second pulse width modulation signal are 240 degrees, 300 degrees, and 360 degrees respectively.

Similarly, the implementation process of adopting the first control scheme is described with reference to the circuit as illustrated in FIG. 4.

Figure 11:
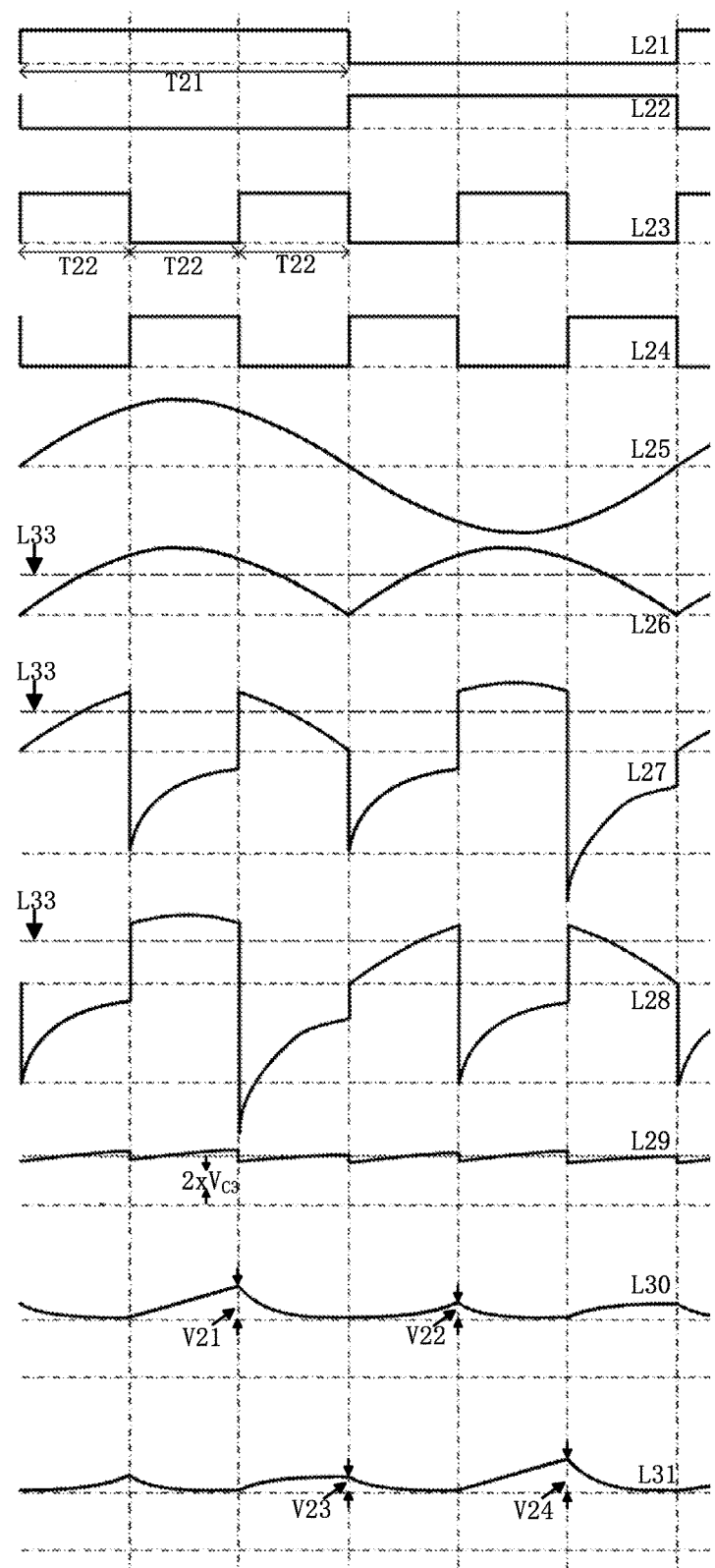
FIG. 11 is a diagram of the voltage and a current waveform of the step-down rectifier circuit according to still another embodiment of the present disclosure.

Continue referencing to FIG. 11, a curve L21 illustrates switch signals of the first switch transistor Q1 and the fourth switch transistor Q4; a curve L22 illustrates switch signals of the second switch transistor Q2 and the third switch transistor Q3; a curve L23 illustrates switch signals of the fifth switch transistor Q5, the seventh switch transistor Q7, the tenth switch transistor Q10, and the twelfth switch transistor Q12; a curve L24 illustrates switch signals of the sixth switch transistor Q6, the eighth switch transistor Q8, the ninth switch transistor Q9, and the eleventh switch transistor Q11; a curve L25 illustrates a waveform of the current I1, and also illustrates a waveform of the alternating current signal 200; a curve L26 illustrates a waveform of the current I2; a curve L27 illustrates a waveform of the current $I_{C1}$; a curve L28 illustrates a waveform of the current $I_{C2}$; a curve L29 illustrates a waveform of a voltage at the connection node 4 between a drain of the fifth switch transistor Q5 and a drain of the ninth switch transistor Q9; a curve L30 illustrates a waveform of the voltage across the second capacitor C2; a curve L31 illustrates a waveform of a voltage across the first capacitor C1; and a curve L33 illustrates a waveform of an average current within the entire cycle.

When the alternating current signal 200 is in the positive half cycle, the first pulse width modulation signal is a high voltage level signal, the corresponding curve L21 illustrates a high voltage level signal, and the curve L22 illustrates a low voltage level signal. In this case, the control unit 40 controls the first switch transistor Q1 and the fourth switch transistor Q4 to be turned on, and controls the second switch transistor Q2 and the third switch transistor Q3 to be turned off.

When the alternating current signal 200 is in the first ⅓ of a positive half cycle, the second pulse width modulation signal is a high voltage level signal, the corresponding curve L23 illustrates a high voltage level signal, and the curve L24 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 10 charges the first capacitor C1 through the fifth switch transistor Q5 and the seventh switch transistor Q7, and the second capacitor C2 discharges power to the filter capacitor C3 and a load through the tenth switch transistor Q10 and the twelfth switch transistor Q12.

When the alternating current signal 200 is in the second ⅓ of a positive half cycle, the second pulse width modulation signal is a low voltage level signal, the corresponding curve L23 illustrates a low voltage level signal, and the curve L24 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 10 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

When the alternating current signal 200 is in the third ⅓ of a positive half cycle, the second pulse width modulation signal is a high voltage level signal, the corresponding curve L23 illustrates a high voltage level signal, and the curve L24 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 10 charges the first capacitor C1 through the fifth switch transistor Q5 and the seventh switch transistor Q7, and the second capacitor C2 discharges power to the filter capacitor C3 and the load through the tenth switch transistor Q10 and the twelfth switch transistor Q12.

When the alternating current signal 200 is in the negative half cycle, the first pulse width modulation signal is a low voltage level signal, the corresponding curve L21 illustrates a low voltage level signal, and the curve L22 illustrates a high voltage level signal. In this case, the control unit 40 controls the second switch transistor Q2 and the third switch transistor Q3 to be turned on and controls the first switch transistor Q1 and the fourth switch transistor Q4 to be turned off.

When the alternating current signal 200 is in the first ⅓ of a second half cycle, the second pulse width modulation signal is a low voltage level signal, the corresponding curve L23 illustrates a low voltage level signal, and the curve L24 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 10 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

When the alternating current signal 200 is in the second ⅓ of a second half cycle, the second pulse width modulation signal is a high voltage level signal, the corresponding curve L23 illustrates a high voltage level signal, and the curve L24 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 10 charges the first capacitor C1 through the fifth switch transistor Q5 and the seventh switch transistor Q7, and the second capacitor C2 discharges power to the filter capacitor C3 and the load through the tenth switch transistor Q10 and the twelfth switch transistor Q12.

When the alternating current signal 200 is in the third ⅓ of a second half cycle, the second pulse width modulation signal is a low voltage level signal, the corresponding curve L23 illustrates a low voltage level signal, and the curve L24 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 10 charges the second capacitor C2 through the ninth switch transistor Q9 and the eleventh switch transistor Q11, and the first capacitor C1 discharges power to the filter capacitor C3 and load through the sixth switch transistor Q6 and the eighth switch transistor Q8.

The alternating current signal 200 continuously and alternately operates between the positive half cycle and the negative half cycle. It may be seen from the curve L29 that the voltage $V_{C3}$ at the third connection node 3 is converted to half of the voltage at the fourth connection node 4, the voltage at the fourth connection node 4 is a rectified input voltage, and the voltage $V_{C3}$ is an output voltage, that is, the input voltage is twice the output voltage.

In summary, conducting periods of the first switch transistor Q1, the second switch transistor Q2, the third switch transistor Q3, and the fourth switch transistor Q4 in the rectifier module 10 are T21, and conducting periods of the fifth switch transistor Q5, the sixth switch transistor Q6, and seventh switch transistor Q7, the eighth switch transistor Q8, the ninth switch transistor Q9, the tenth switch transistor Q10, the eleventh switch transistor Q11, and the twelfth switch transistor Q12 in the charge pump module 20 are T22, wherein T22=⅓T21, that is, the operating frequency of the charge pump module 20 is three times the frequency of the alternating current signal 200.

However, although the current I2 charges the first capacitor C1 and the second capacitor C2 for the same duration T22, since the input current I2 has a sinusoidal wave characteristic, an unequal total amount of charges are supplemented to the first capacitor C1 and the second capacitor C2 in each cycle. It may be seen from the curve L25 and the curve L33 in FIG. 11 that, within the first ⅓ and the third ⅓ of a positive half cycle of the waveform of the current I1, that is, the waveform of the alternating current signal 200, the average current is obviously less than the average current within the entire cycle, and currents within a second ⅓ of the positive half cycle of the alternating current signal 200 are all greater than the average current within the entire cycle. This also causes an unequal voltage difference between the voltage across the second capacitor C2 and the voltage at the third connection node 3 (that is, the output voltage) upon completion of each charging cycle, and also an unequal voltage difference between the voltage across the first capacitor C1 and the voltage at the third connection node 3 upon completion of each charging cycle. For example, as illustrated in the curve L25 and the curve L30, at the end of the second ⅓ of the positive half cycle of the waveform of the alternating current signal 200, the voltage difference between the voltage across the second capacitor C2 and the voltage at the third connection node 3 is V21, which is significantly greater than the voltage difference V22 between the voltage across the second capacitor C2 and the voltage at the third connection point 3 at the end of the first ⅓ of the negative half cycle of the waveform of the alternating current signal 200. Similarly, it may be seen from the curve L31 that the voltage difference between the voltage across the first capacitor C1 and the voltage at the third connection node 3 is V24, which is significantly greater than the voltage difference V23 between the voltage across the first capacitor C1 and the voltage at the third connection node 3. The different voltage differences also cause different amplitudes of the pulse currents generated at the same instant when the first capacitor C1 and the second capacitor C2 discharge power to the load and the filter capacitor C3. In combination with the curve L25 and the curve L28, it may be seen that the second capacitor C2 discharges power to the filter capacitor C3 and the load at the beginning of the third ⅓ in the positive half cycle of the waveform of the alternating current signal 200. Since more charges are accumulated in the previous charging cycle, a current pulse peak value generated when the second capacitor C2 discharges power is also greater than that in other discharging cycles. The average value of the currents in the discharging cycle is also greater than that in other discharging cycles, which results in uneven current distribution. Therefore, when the operating frequency of the charge pump module 20 is three times or more of the frequency of the alternating current signal 200, in the first control scheme, that is, the second pulse width modulation signal uses the 50% duty cycle, a small improvement may be made to the efficiency.

Furthermore, the second control scheme needs to be adopted, the second pulse width modulation signal uses non-50% duty cycles. The implementation process of adopting the second control scheme is described with reference to the circuit as illustrated in FIG. 4.

Specifically, in the case that a capacitance of the first capacitor C1 or the second capacitor C2 is less than a capacitance of the filter capacitor C3, When the alternating current signal 200 is in a positive half cycle, the $k^{th}$ voltage level transition of the second pulse width modulation signal occurs when the phase angle $\theta 2_k$ of the alternating current signal 200 is:

$$\theta 2_k = \arccos\left(1 - \frac{2k}{N}\right)$$

wherein k=0, 1, 2, . . . , N.

The operating frequency of the charge pump module 20 is N times the frequency of the alternating current signal 200, wherein N is a positive integer. When the alternative current signal 200 is in a negative half cycle, the phase angle of the alternating current signal 200 during each voltage level transition of the second pulse width modulation signal 200 is symmetrical to the phase angle of the alternating current signal 200 in the positive half cycle.

According to the formula of the phase angle, using N selected from 1 to 10 as an example, the phase angles are calculated by introducing N into the formula, as listed in Table 1.

TABLE 1

| N | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ |
|---|---|---|---|---|---|---|---|---|---|---|
| 1 | 180.0 | | | | | | | | | |
| 2 | 90.0 | 180.0 | | | | | | | | |
| 3 | 70.5 | 109.5 | 180.0 | | | | | | | |
| 4 | 60.0 | 90.0 | 120.0 | 180.0 | | | | | | |
| 5 | 53.1 | 78.5 | 101.5 | 126.9 | 180.0 | | | | | |
| 6 | 48.2 | 70.5 | 90.0 | 109.5 | 131.8 | 180.0 | | | | |
| 7 | 44.4 | 64.6 | 81.8 | 98.2 | 115.4 | 135.6 | 180.0 | | | |
| 8 | 41.4 | 60.0 | 75.5 | 90.0 | 104.5 | 120.0 | 138.6 | 180.0 | | |
| 9 | 38.9 | 56.3 | 70.5 | 83.6 | 96.4 | 109.5 | 123.7 | 141.1 | 180.0 | |
| 10 | 36.9 | 53.1 | 66.4 | 78.5 | 90.0 | 101.5 | 113.6 | 126.9 | 143.1 | 180.0 |

It may be seen from Table 1 that when N is equal to 1, the voltage level transitions of the second pulse width modulation signal occurs when the phase angles of the alternating current signal 200 are 180 degrees and 360 degrees; when N is equal to 2, the voltage level transitions of the second pulse width modulation signal occurs when the phase angles of the alternating current signal 200 are 90 degrees, 180 degrees, 270 degrees and 360 degrees respectively; when N is equal to 3, the voltage level transitions of the second pulse width modulation signal occurs when phase angles of the alternating current signal 200 are 70.5 degrees, 109.5 degrees, 180 degrees, 250.5 degrees, 289.5 degrees, and 360 degrees respectively. Analogously, when N takes different values, the phase angles of the alternating current signal 200 during each voltage level transition of the second pulse width modulation signal may be obtained. The phase angles exceeding 180 degrees in the above phase angles are phase angles of the alternating current signal 200 during voltage level transition of the second pulse width modulation signal when the alternating current signal 200 is in a negative half cycle and are symmetrical to the phase angles of the alternating current signal 200 in the negative half cycle. The angles corresponding to the positive and negative half cycles differ by 180 degrees, for example, angles of 70.5 degrees and 250.5 degrees.

Figure 12:
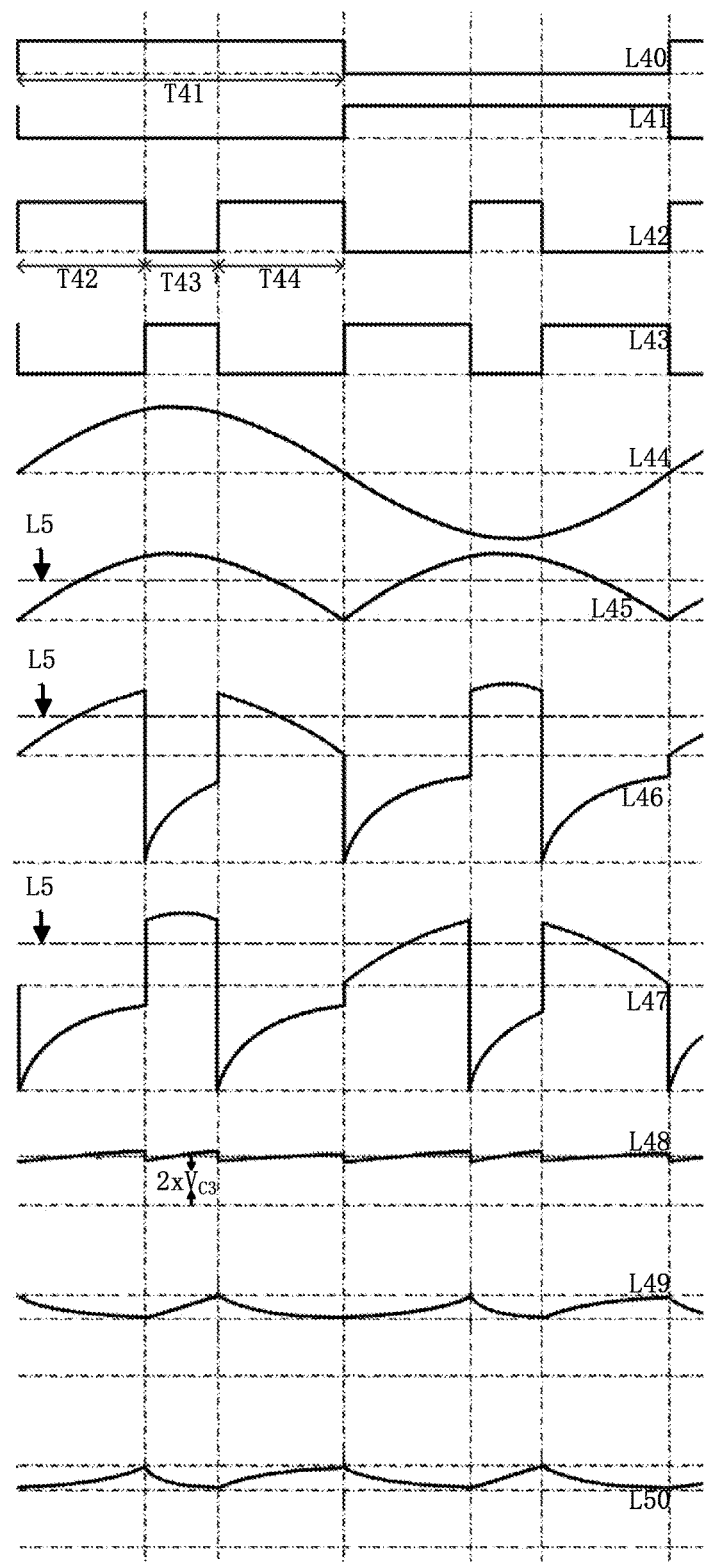
FIG. 12 is a diagram of the voltage and a current waveform of the step-down rectifier circuit according to yet still another embodiment of the present disclosure.

Continue referencing to FIG. 12, a curve L40 illustrates switch signals of the first switch transistor Q1 and the fourth switch transistor Q4; a curve L41 illustrates switch signals of the second switch transistor Q2 and the third switch transistor Q3; a curve L42 illustrates switch signals of the fifth switch transistor Q5, the seventh switch transistor Q7, the tenth switch transistor Q10, and the twelfth switch transistor Q12; a curve L43 illustrates switch signals of the sixth switch transistor Q6, the eighth switch transistor Q8, the ninth switch transistor Q9, and the eleventh switch transistor Q11; a curve L44 illustrates a waveform of the current I1, and also illustrates a waveform of the alternating current signal 200; a curve L45 illustrates a waveform of the current I2; a curve L46 illustrates a waveform of the current $I_{C1}$; a curve L47 illustrates a waveform of the current $I_{C2}$; a curve L48 illustrates a waveform of a voltage at the connection node 4 between a drain of the fifth switch transistor Q5 and a drain of the ninth switch transistor Q9; a curve L49 illustrates a waveform of the voltage across the second capacitor C2; a curve L50 illustrates a waveform of a voltage across the first capacitor C1; and a curve L51 illustrates a waveform of an average current within the entire cycle.

When the alternating current signal 200 is in a positive half cycle, the first pulse width modulation signal is a high voltage level signal, the corresponding curve L40 illustrates a high voltage level signal, and the curve L41 illustrates a low voltage level signal. In this case, the control unit 40 controls the first switch transistor Q1 and the fourth switch transistor Q4 to be turned on and controls the second switch transistor Q2 and the third switch transistor Q3 to be turned off.

When the alternating current signal 200 is in an interval from 0 degrees to 70.5 degrees, the second pulse width modulation signal is a high voltage level signal, the corresponding curve L42 illustrates a high voltage level signal, and the curve L43 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 20 charges the first capacitor C1 through the fifth switch transistor Q5 and the seventh switch transistor Q7, and the second capacitor C2 discharges power to the filter capacitor C3 and the load through the tenth switch transistor Q10 and the twelfth switch transistor Q12.

When the alternating current signal 200 is in an interval from 70.5 degrees to 109.5 degrees, the second pulse width modulation signal is a low voltage level signal, the corresponding curve L42 illustrates a low voltage level signal, and the curve L43 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 20 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

When the alternating current signal 200 is in an interval from 109.5 degrees to 180 degrees, the second pulse width modulation signal is a high voltage level signal, the corresponding curve L42 illustrates a high voltage level signal, and the curve L43 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 20 charges the first capacitor C1 through the fifth switch transistor Q5 and the seventh switch transistor Q7, and the second capacitor C2 discharges power to the filter capacitor C3 and a load through the tenth switch transistor Q10 and the twelfth switch transistor Q12.

When the alternating current signal 200 is in a negative half cycle, the first pulse width modulation signal is a low voltage level signal, the corresponding curve L42 illustrates a low voltage level signal, and the curve L43 illustrates a high voltage level signal. In this case, the control unit 40 controls the second switch transistor Q2 and the third switch transistor Q3 to be turned on and controls the first switch transistor Q1 and the fourth switch transistor Q4 to be turned off.

When the alternating current signal 200 is in an interval from 180 degrees to 250.5 degrees, the second pulse width modulation signal is a low voltage level signal, the corresponding curve L42 illustrates a low voltage level signal, and the curve L43 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 20 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

When the alternating current signal 200 is in an interval from 250.5 degrees to 289.5 degrees, the second pulse width modulation signal is a high voltage level signal, the corresponding curve L42 illustrates a high voltage level signal, and the curve L43 illustrates a low voltage level signal. In this case, the control unit 40 controls the fifth switch transistor Q5, the seventh switch transistor Q7, the tenth switch transistor Q10, and the twelfth switch transistor Q12 to be turned on, and controls the sixth switch transistor Q6, the eighth switch transistor Q8, the ninth switch transistor Q9, and the eleventh switch transistor Q11 to be turned off. The current I2 flowing through the rectifier module 20 charges the first capacitor C1 through the fifth switch transistor Q5 and the seventh switch transistor Q7, and the second capacitor C2 discharges power to the filter capacitor C3 and the load through the tenth switch transistor Q10 and the twelfth switch transistor Q12.

When the alternating current signal 200 is in an interval from 289.5 degrees to 360 degrees, the second pulse width modulation signal is a low voltage level signal, the corresponding curve L42 illustrates a low voltage level signal, and the curve L43 illustrates a high voltage level signal. In this case, the control unit 40 controls the sixth switch transistor Q6, the eighth switch transistor Q8, the ninth switch transistor Q9, and the eleventh switch transistor Q11 to be turned on, and controls the fifth switch transistor Q5, the seventh switch transistor Q7, the tenth switch transistor Q10, and the twelfth switch transistor Q12 to be turned off. The current I2 flowing through the rectifier module 20 charges the second capacitor C2 through the ninth switch transistor Q9 and the eleventh switch transistor Q11, and the first capacitor C1 discharges power to the filter capacitor C3 and the load through the sixth switch transistor Q6 and the eighth switch transistor Q8.

The alternating current signal 200 continuously and alternately operates between the positive half cycle and the negative half cycle. It may be seen from the curve L48 that the voltage $V_{C3}$ at the third connection node 3 is converted to half of the voltage at the fourth connection node 4, the voltage at the fourth connection node 4 is a rectified input voltage, and the voltage $V_{C3}$ is an output voltage, that is, the input voltage is twice the output voltage.

In addition, the duration of the positive half cycle of the alternating current signal 200 is T41. In this scheme, by extending a duration T42 of the second pulse width modulation signal in a first section of the positive half cycle of the alternating current signal 200 and a duration T44 in a third section of the positive half cycle of the alternating current signal 200, and shortening the duration T43 in a second section of the positive half cycle, an equal total amount of charges are supplied to the first capacitor C1 and the second capacitor C2 within each of the three sections of the positive half cycle. The second pulse width modulation signal divides the positive half cycle and negative half cycle of the alternating current signal 200 into three sections respectively. The conducting phase angles of the first section and the third section correspond to 70.5 degrees at the frequency of the alternating current signal 200, and the conducting phase angle of the second section is 39 degrees, such that an equal total amount of changes are received by the first capacitor C1 and the second capacitor C2 during each charging process. In combination with the curve L49 and the curve L50, it may be seen that, in this method, an equal voltage difference between the voltage across the second capacitor C2 and the voltage at the third connection node 3 (that is, the output voltage) is achieved at the end of each charging cycle. In combination with the curve L46 and the curve L47, it may be seen that amplitudes of the pulse currents of the first capacitor C1 and the second capacitor C2 are equal at the beginning of the discharging cycle in which the first capacitor C1 and the second capacitor C2 discharge power to the load and the filter capacitor C3. In this case, total loss during the discharging process of the first capacitor C1 and the second capacitor C2 may be reduced to the minimum, thereby maintaining the efficiency advantage of applying voltage source to the circuit structure at the same operating frequency, and achieving higher power conversion efficiency.

In the case that a capacitance of the first capacitor C1 or the second capacitor C2 is greater than or equal to a capacitance of the filter capacitor C3, an optimal configuration of the second pulse width modulation signal corresponding to a maximum power conversion efficiency is between the first control scheme (that is, the 50% duty cycle) and the second control scheme. That is, when the alternating current signal 200 is in a positive half cycle and N is an even number, an m$^{th}$ voltage level transition of the second pulse width modulation signal occurs when the phase angle θ3$_m$ of the alternating current signal 200 satisfies:

$$\frac{m\pi}{N} \leq \theta 3_m \leq \arccos\left(1 - \frac{2m}{N}\right)$$

wherein m=0, 1, 2, ..., N/2.

Meanwhile, the phase angle further satisfies:

$$\frac{m\pi}{N} \geq \theta 3_m \geq \arccos\left(1 - \frac{2m}{N}\right)$$

wherein m=N, N−1, ..., N/2.

When N is an odd number, the m$^{th}$ voltage level transition of the second pulse width modulation signal occurs when the phase angle θ3$_m$ of the alternating current signal satisfies:

$$\frac{m\pi}{N} \leq \theta 3_m \leq \arccos\left(1 - \frac{2m}{N}\right)$$

wherein m=0, 1, 2, ..., (N−1)/2.

Meanwhile, the phase angle further satisfies:

$$\frac{m\pi}{N} \geq \theta 3_m \geq \arccos\left(1 - \frac{2m}{N}\right)$$

wherein m=N, N−1, ..., (N+1)/2.

The operating frequency of the charge pump module 20 is N times the frequency of the alternating current. When the alternating current signal 200 is in a negative half cycle, the phase angle of the alternating current signal 200 during each voltage level transition of the second pulse width modulation signal is symmetrical to the phase angle of the alternating current signal 200 in a positive half cycle.

In the case that the second control scheme is adopted, a process of controlling the capacitance of the first capacitor C1 or the second capacitor C2 to be greater than or equal to the capacitance of the filter capacitor C3 is similar to the process of controlling the capacitance of the first capacitor C1 or the second capacitor C2 to be less than the capacitance of the filter capacitor C3, which is easily understood by a person skilled in the art within the scope of the present disclosure, and is not detailed herein any further.

In the case that the second control scheme is adopted, in both the above two control processes, the operating frequency of the charge pump module 20 is made to a positive integer multiple of the frequency of the alternating current signal 200, and the two parts of circuits of the rectifier module 10 and the charge pump module operate together to achieve a higher power conversion efficiency. In addition, the charges obtained by the first capacitor C1 or the second capacitor C2 during each charging cycle are the same, thereby achieving an optimal operating efficiency of the system.

The present disclosure further provides a wireless charging receiver chip. The wireless charging receiver chip includes the step-down rectifier circuit as described above.

The present disclosure further provides a wireless charging receiver. The wireless charging receiver includes a wireless charging receiver coil and the wireless charging receiver chip as described above, wherein the wireless charging receiver coil is configured to generate the alternating current signal 200.

The step-down rectifier circuit in the embodiments of the present disclosure includes the rectifier module 10, the charge pump module 20, the filter unit 30, and the control unit 40. The rectifier module 10 includes the first bridge arm unit 11 and the second bridge arm unit 12. The first bridge arm unit 11 is connected in parallel with the second bridge arm unit 12. The first bridge arm unit 11 is connected to an in-phase output terminal of an externally input alternating current signal 200 and the second bridge arm unit 12 is connected to an out-of-phase output terminal of the alternating current signal 200. The charge pump module 20 is connected to the rectifier module 10, and the charge pump module 20 includes the first voltage converter unit 21 and the second voltage converter unit 22. The first voltage converter unit 21 is connected in parallel with the second voltage converter unit 22 and the second bridge arm unit 12. The filter unit 30 is connected to a voltage output terminal of the first voltage converter unit 21 and a voltage output terminal of the second voltage converter unit 22. The control unit 40 is connected to the rectifier module 10 and the charge pump module 20, and the control unit 40 is configured to output the first pulse width modulation signal to control the on and off of the switch transistors in the rectifier module 10 and output the second pulse width modulation signal to control the on and off of the switch transistors in the charge pump module 20, such that the operating frequency of the charge pump module 20 is a positive integer multiple of the frequency of the alternating current signal 200. Under such configurations, the two parts of circuits of the rectifier module 10 and the charge pump module 20 operate together to achieve a higher power conversion efficiency, that is, power conversion efficiency during wireless charging may be improved.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A step-down rectifier circuit, comprising:
    a rectifier module, comprising a first bridge arm unit and a second bridge arm unit, wherein the first bridge arm unit is connected in parallel with the second bridge arm unit, the first bridge arm unit is connected to an in-phase output terminal of an alternating current signal, and the second bridge arm unit is connected to an out-of-phase output terminal of the alternating current signal;
    a charge pump module connected to the rectifier module, wherein the charge pump module comprises a first voltage converter unit and a second voltage converter unit, the first voltage converter unit being connected in parallel with the second voltage converter unit and the second bridge arm unit;
    a filter unit connected to a voltage output terminal of the first voltage converter unit and a voltage output terminal of the second voltage converter unit; and
    a control unit connected to the rectifier module and the charge pump module, wherein the control unit is configured to output, based on the alternating current signal, a first pulse width modulation signal to control the on and off of switch transistors in the rectifier module, and output a second pulse width modulation signal to control the on and off of switch transistors in the charge pump module, such that an operating frequency of the charge pump module is N times a frequency of the alternating current signal, wherein N is a positive integer.

2. The step-down rectifier circuit according to claim 1, wherein:
    when the alternating current signal is in a positive half cycle, an $n^{th}$ voltage level transition of the second pulse width modulation signal occurs when a phase angle of the alternating current signal is:

$$\theta 1_n = \frac{n\pi}{N}$$

wherein n=0, 1, 2, . . . , N; or
    when the alternating current signal is in a negative half cycle, the phase angle of the alternating current signal during each voltage level transition of the second pulse width modulation signal is symmetrical to the phase angle of the alternating current signal in the positive half cycle.

3. The step-down rectifier circuit according to claim 1, wherein:
    the first voltage converter unit comprises a first capacitor and a first switch assembly, wherein the first capacitor is connected to the first switch assembly, and the first capacitor is configured to be charged or discharged based on the on or off state of the first switch assembly;
    the second voltage converter unit comprises a second capacitor and a second switch assembly, wherein the second capacitor is connected to the second switch assembly, and the second capacitor is configured to be charged or discharged based on the on or off state of the second switch assembly; and
    the filter unit comprises a filter capacitor, wherein one terminal of the filter capacitor is connected to the voltage output terminal of the first voltage converter unit and the voltage output terminal of the second voltage converter unit, and the other terminal of the filter capacitor is connected to ground.

4. The step-down rectifier circuit according to claim 3, wherein a capacitance of the first capacitor or the second capacitor is less than a capacitance of the filter capacitor, wherein:
    when the alternating current signal is in a positive half cycle, a $k^{th}$ voltage level transition of the second pulse width modulation signal occurs when a phase angle of the alternating current signal is:

$$\theta 2_k = \arccos\left(1 - \frac{2k}{N}\right)$$

wherein k=0, 1, 2, . . . , N; or
  when the alternating current signal is in a negative half cycle, the phase angle of the alternating current signal during each voltage level transition of the second pulse width modulation signal is symmetrical to the phase angle of the alternating current signal in the positive half cycle.

5. The step-down rectifier circuit according to claim 3, wherein a capacitance of the first capacitor or the second capacitor is greater than or equal to a capacitance of the filter capacitor, and wherein:
  when the alternating current signal is in a positive half cycle, and wherein:
    when N is an even number, an $m^{th}$ voltage level transition of the second pulse width modulation signal occurs when a phase angle of the alternating current signal satisfies:

$$\frac{m\pi}{N} \le \theta 3_m \le \arccos\left(1 - \frac{2m}{N}\right)$$

wherein m=0, 1, 2, . . . , N/2; and the phase angle further satisfies:

$$\frac{m\pi}{N} \ge \theta 3_m \ge \arccos\left(1 - \frac{2m}{N}\right)$$

wherein m=N, N−1, . . . , N/2; or
    when N is an odd number, the $m^{th}$ voltage level transition of the second pulse width modulation signal occurs when the phase angle of the alternating current signal satisfies:

$$\frac{m\pi}{N} \le \theta 3_m \le \arccos\left(1 - \frac{2m}{N}\right)$$

wherein m=0, 1, 2, . . . , (N−1)/2; and the phase angle further satisfies:

$$\frac{m\pi}{N} \ge \theta 3_m \ge \arccos\left(1 - \frac{2m}{N}\right)$$

wherein m=N, N−1, . . . , (N+1)/2; or
  when the alternating current signal is in a negative half cycle, the phase angle of the alternating current signal during each voltage level transition of the second pulse width modulation signal is symmetrical to the phase angle of the alternating current signal in a positive half cycle.

6. The step-down rectifier circuit according to claim 3, wherein:
  the first bridge arm unit comprises a first switch transistor and a second switch transistor, and wherein the first switch transistor and the second switch transistor are connected in series in the same direction, and a connection node between a source of the first switch transistor and a drain of the second switch transistor is a first connection node, and the in-phase output terminal of the alternating current signal is connected to the first connection node;
  the second bridge arm unit comprises a third switch transistor and a fourth switch transistor, and wherein the third switch transistor and the fourth switch transistor are connected in series in the same direction, and a connection node between a source of the third switch transistor and a drain of the fourth switch transistor is a second connection node, the out-of-phase output terminal of the alternating current signal is connected to the second connection node;
  the first switch assembly comprises a fifth switch transistor, a sixth switch transistor, a seventh switch transistor, and an eighth switch transistor that are successively connected in series in the same direction, and wherein one terminal of the first capacitor is connected to a source of the fifth switch transistor, and the other terminal of the first capacitor is connected to a source of the seventh switch transistor;
  the second switch assembly comprises a ninth switch transistor, a tenth switch transistor, an eleventh switch transistor, and a twelfth switch transistor that are successively connected in series in the same direction, and wherein one terminal of the second capacitor is connected to a source of the ninth switch transistor, and the other terminal of the second capacitor is connected to a source of the eleventh switch transistor, and wherein:
    a drain of the first switch transistor is connected to a drain of the third switch transistor, a drain of the fifth switch transistor and a drain of the ninth switch transistor; and a source of the second switch transistor, a source of the fourth switch transistor, a source of the eighth switch transistor and a source of the twelfth switch transistor are all connected to ground; and
    a connection node between the sixth switch transistor and the seventh switch transistor and a connection node between the tenth switch transistor and the eleventh switch transistor are both connected to one terminal of the filter capacitor at a third connection node.

7. The step-down rectifier circuit according to claim 6, wherein:
  in response to the first pulse width modulation signal being at a high voltage level, the control unit controls the first switch transistor and the fourth switch transistor to be turned on, and controls the second switch transistor and the third switch transistor to be turned off;
  in response to the first pulse width modulation signal being at a low voltage level, the control unit controls the second switch transistor and the third switch transistor to be turned on, and controls the first switch transistor and the fourth switch transistor to be turned off;
  in response to the second pulse width modulation signal being at a high voltage level, the control unit controls the fifth switch transistor, the seventh switch transistor, the tenth switch transistor, and the twelfth switch transistor to be turned on, and controls the sixth switch transistor, the eighth switch transistor, the ninth switch transistor, and the eleventh switch transistor to be turned off; and
  in response to the second pulse width modulation signal being at a low voltage level, the control unit controls the sixth switch transistor, the eighth switch transistor, the ninth switch transistor, and the eleventh switch transistor to be turned on, and controls the fifth switch transistor, the seventh switch transistor, the tenth switch transistor, and the twelfth switch transistor to be turned off, and wherein:

at a zero-crossing of the alternating current signal, voltage level transitions of the first pulse width modulation signal and the second pulse width modulation signal occurs simultaneously.

8. The step-down rectifier circuit according to claim 1, further comprising:
a regulator circuit, wherein the regulator circuit comprises a thirteenth switch transistor and a fourth capacitor, and wherein:
a drain of the thirteenth switch transistor is connected to a third connection node, a source of the thirteenth switch transistor is connected to one terminal of the fourth capacitor, and the other terminal of the fourth capacitor is connected to ground.

9. The step-down rectifier circuit according to claim 1, further comprising:
a bias power supply circuit, wherein the bias power supply circuit comprises a first bias switch transistor, a second bias switch transistor, a low-dropout linear regulator, and a second filter capacitor, wherein:
a voltage input terminal of the low-dropout linear regulator is connected to a drain of the first bias switch transistor, a drain of the second bias switch transistor, and one terminal of the second filter capacitor;
a source of the first bias switch transistor is connected to the in-phase output terminal;
a source of the second bias switch transistor is connected to the out-of-phase output terminal; and
the other terminal of the second filter capacitor is connected to ground.

10. The step-down rectifier circuit according to claim 1, further comprising:
a bias power supply circuit, wherein the bias power supply circuit comprises a first diode, a second diode, a low-dropout linear regulator, and a second filter capacitor, and wherein:
a voltage input terminal of the low-dropout linear regulator is connected to a cathode of the first diode, a cathode of the second diode, and one terminal of the second filter capacitor;
an anode of the first diode is connected to the in-phase output terminal;
an anode of the second diode is connected to the out-of-phase output terminal; and
the other terminal of the second filter capacitor is connected to ground.

11. A wireless charging receiver chip comprising:
a step-down rectifier circuit, wherein the step-down rectifier circuit comprises:
a rectifier module comprising a first bridge arm unit and a second bridge arm unit, and wherein the first bridge arm unit is connected in parallel with the second bridge arm unit, the first bridge arm unit is connected to an in-phase output terminal of an alternating current signal, and the second bridge arm unit is connected to an out-of-phase output terminal of the alternating current signal;
a charge pump module connected to the rectifier module, and wherein the charge pump module comprises a first voltage converter unit and a second voltage converter unit, the first voltage converter unit is connected in parallel with the second voltage converter unit and the second bridge arm unit;
a filter unit connected to a voltage output terminal of the first voltage converter unit and a voltage output terminal of the second voltage converter unit; and
a control unit connected to the rectifier module and the charge pump module, and wherein the control unit is configured to output, based on the alternating current signal, a first pulse width modulation signal to control the on and off of switch transistors in the rectifier module, and output a second pulse width modulation signal to control the on and off of switch transistors in the charge pump module, such that an operating frequency of the charge pump module is N times a frequency of the alternating current signal, wherein N is a positive integer.

12. A wireless charging receiver comprising:
a wireless charging receiver coil configured to generate an alternating current signal; and
a wireless charging receiver chip comprising a step-down rectifier circuit, wherein the step-down rectifier circuit comprises:
a rectifier module comprising a first bridge arm unit and a second bridge arm unit, and wherein the first bridge arm unit is connected in parallel with the second bridge arm unit, the first bridge arm unit is connected to an in-phase output terminal of the alternating current signal, and the second bridge arm unit is connected to an out-of-phase output terminal of the alternating current signal;
a charge pump module connected to the rectifier module, and wherein the charge pump module comprises a first voltage converter unit and a second voltage converter unit, the first voltage converter unit is connected in parallel with the second voltage converter unit and the second bridge arm unit;
a filter unit connected to a voltage output terminal of the first voltage converter unit and a voltage output terminal of the second voltage converter unit; and
a control unit connected to the rectifier module and the charge pump module, and wherein the control unit is configured to output, based on the alternating current signal, a first pulse width modulation signal to control the on and off of switch transistors in the rectifier module, and output a second pulse width modulation signal to control the on and off of switch transistors in the charge pump module, such that an operating frequency of the charge pump module is N times a frequency of the alternating current signal, wherein N is a positive integer.

13. The wireless charging receiver according to claim 12, wherein:
when the alternating current signal is in a positive half cycle, an $n^{th}$ voltage level transition of the second pulse width modulation signal occurs when a phase angle of the alternating current signal is:

$$\theta 1_n = \frac{n\pi}{N}$$

wherein n=0, 1, 2, ..., N; or
when the alternating current signal is in a negative half cycle, the phase angle of the alternating current signal during each voltage level transition of the second pulse width modulation signal is symmetrical to the phase angle of the alternating current signal in the positive half cycle.

14. The wireless charging receiver according to claim 12, wherein:
the first voltage converter unit comprises a first capacitor and a first switch assembly, and wherein the first capacitor is connected to the first switch assembly, and the first capacitor is configured to be charged or discharged based on the on or off state of the first switch assembly;

the second voltage converter unit comprises a second capacitor and a second switch assembly, and wherein the second capacitor is connected to the second switch assembly, and the second capacitor is configured to be charged or discharged based on the on or off state of the second switch assembly; and the filter unit comprises a filter capacitor, and wherein one terminal of the filter capacitor is connected to the voltage output terminal of the first voltage converter unit and the voltage output terminal of the second voltage converter unit, and the other terminal of the filter capacitor is connected to ground.

15. The wireless charging receiver according to claim 14, wherein a capacitance of the first capacitor or the second capacitor is less than a capacitance of the filter capacitor, and wherein:

when the alternating current signal being in a positive half cycle, a $k^{th}$ voltage level transition of the second pulse width modulation signal occurs when a phase angle of the alternating current signal is:

$$\theta 2_k = \arccos\left(1 - \frac{2k}{N}\right)$$

wherein k=0, 1, 2, . . . , N; or when the alternating current signal is in a negative half cycle, the phase angle of the alternating current signal during each voltage level transition of the second pulse width modulation signal is symmetrical to the phase angle of the alternating current signal in the positive half cycle.

16. The wireless charging receiver according to claim 14, wherein a capacitance of the first capacitor or the second capacitor is greater than or equal to a capacitance of the filter capacitor, and wherein:

when the alternating current signal being in a positive half cycle, and wherein:

when N is an even number, an $m^{th}$ voltage level transition of the second pulse width modulation signal occurs when a phase angle of the alternating current signal satisfies:

$$\frac{m\pi}{N} \leq \theta 3_m \leq \arccos\left(1 - \frac{2m}{N}\right)$$

wherein m=0, 1, 2, . . . , N/2; and the phase angle further satisfies:

$$\frac{m\pi}{N} \geq \theta 3_m \geq \arccos\left(1 - \frac{2m}{N}\right)$$

wherein m=N, N−1, . . . , N/2; or when N is an odd number, the $m^{th}$ voltage level transition of the second pulse width modulation signal occurs when the phase angle of the alternating current signal satisfies:

$$\frac{m\pi}{N} \leq \theta 3_m \leq \arccos\left(1 - \frac{2m}{N}\right)$$

wherein m=0, 1, 2, . . . , (N−1)/2; and the phase angle further satisfies:

$$\frac{m\pi}{N} \geq \theta 3_m \geq \arccos\left(1 - \frac{2m}{N}\right)$$

wherein m=N, N−1, . . . , (N+1)/2; or when the alternating current signal is in a negative half cycle, the phase angle of the alternating current signal during each voltage level transition of the second pulse width modulation signal is symmetrical to the phase angle of the alternating current signal in the positive half cycle.

17. The wireless charging receiver according to claim 14, wherein:

the first bridge arm unit comprises a first switch transistor and a second switch transistor, and wherein the first switch transistor and the second switch transistor are connected in series in the same direction, a connection node between a source of the first switch transistor and a drain of the second switch transistor is a first connection node, and the in-phase output terminal of the alternating current signal is connected to the first connection node;

the second bridge arm unit comprises a third switch transistor and a fourth switch transistor, and wherein the third switch transistor and the fourth switch transistor are connected in series in the same direction, a connection node between a source of the third switch transistor and a drain of the fourth switch transistor is a second connection node, and the out-of-phase output terminal of the alternating current signal is connected to the second connection node;

the first switch assembly comprises a fifth switch transistor, a sixth switch transistor, a seventh switch transistor, and an eighth switch transistor that are successively connected in series in the same direction, and wherein one terminal of the first capacitor is connected to a source of the fifth switch transistor, and the other terminal of the first capacitor is connected to a source of the seventh switch transistor; and the second switch assembly comprises a ninth switch transistor, a tenth switch transistor, an eleventh switch transistor, and a twelfth switch transistor that are successively connected in series in the same direction, and wherein one terminal of the second capacitor is connected to a source of the ninth switch transistor, and the other terminal of the second capacitor is connected to a source of the eleventh switch transistor, and wherein:

a drain of the first switch transistor is connected to a drain of the third switch transistor, a drain of the fifth switch transistor and a drain of the ninth switch transistor;

a source of the second switch transistor, a source of the fourth switch transistor, a source of the eighth switch transistor and a source of the twelfth switch transistor are all connected to ground;

a connection node between the sixth switch transistor and the seventh switch transistor and a connection node between the tenth switch transistor and the eleventh switch transistor are both connected to one terminal of the filter capacitor at a third connection node;

in response to the first pulse width modulation signal being at a high voltage level, the control unit controls the first switch transistor and the fourth switch transistor to be turned on, and controls the second switch transistor and the third switch transistor to be turned off;

in response to the first pulse width modulation signal being at a low voltage level, the control unit controls the second switch transistor and the third switch transistor to be turned on, and controls the first switch transistor and the fourth switch transistor to be turned off;

in response to the second pulse width modulation signal being at a high voltage level, the control unit controls the fifth switch transistor, the seventh switch transistor, the tenth switch transistor and the twelfth switch transistor to be turned on; and controls the sixth switch transistor, the eighth switch transistor, the ninth switch transistor and the eleventh switch transistor to be turned off; and in response to the second pulse width modulation signal being at a low voltage level, the control unit controls the sixth switch transistor, the eighth switch transistor, the ninth switch transistor and the eleventh switch transistor to be turned on; and controls the fifth switch transistor, the seventh switch transistor, the tenth switch transistor and the twelfth switch transistor to be turned off, and wherein at a zero-crossing of the alternating current signal, voltage level transitions of the first pulse width modulation signal and the second pulse width modulation signal occurs simultaneously.

18. The wireless charging receiver according to claim 12, wherein the step-down rectifier circuit further comprises:

a regulator circuit comprising a thirteenth switch transistor and a fourth capacitor, and wherein:

a drain of the thirteenth switch transistor is connected to a third connection node;

a source of the thirteenth switch transistor is connected to one terminal of the fourth capacitor; and the other terminal of the fourth capacitor is connected to ground.

19. The wireless charging receiver according to claim 12, wherein the step-down rectifier circuit further comprises a bias power supply circuit comprising:

a first bias switch transistor, a second bias switch transistor, a low-dropout linear regulator, and a second filter capacitor, and wherein:

a voltage input terminal of the low-dropout linear regulator is connected to a drain of the first bias switch transistor, a drain of the second bias switch transistor, and one terminal of the second filter capacitor;

a source of the first bias switch transistor is connected to the in-phase output terminal;

a source of the second bias switch transistor is connected to the out-of-phase output terminal; and the other terminal of the second filter capacitor is connected to ground.

20. The wireless charging receiver according to claim 12, wherein the step-down rectifier circuit further comprises a bias power supply circuit comprising:

a first diode, a second diode, a low-dropout linear regulator, and a second filter capacitor, and wherein:

a voltage input terminal of the low-dropout linear regulator is connected to a cathode of the first diode, a cathode of the second diode and one terminal of the second filter capacitor;

an anode of the first diode is connected to the in-phase output terminal;

an anode of the second diode is connected to the out-of-phase output terminal; and the other terminal of the second filter capacitor is connected to ground.

\* \* \* \* \*